US012372891B2

(12) United States Patent
Ishizuka et al.

(10) Patent No.: US 12,372,891 B2
(45) Date of Patent: Jul. 29, 2025

(54) TONER FOR DEVELOPING ELECTROSTATIC CHARGE IMAGE AND ELECTROSTATIC CHARGE IMAGE DEVELOPER

(71) Applicant: FUJIFILM Business Innovation Corp., Tokyo (JP)

(72) Inventors: Daisuke Ishizuka, Kanagawa (JP); Keita Yamamoto, Kanagawa (JP)

(73) Assignee: FUJIFILM Business Innovation Corp., Tokyo (JP)

( * ) Notice: Subject to any disclaimer, the term of this patent is extended or adjusted under 35 U.S.C. 154(b) by 344 days.

(21) Appl. No.: 17/495,081

(22) Filed: Oct. 6, 2021

(65) Prior Publication Data

US 2022/0390866 A1 Dec. 8, 2022

(30) Foreign Application Priority Data

May 25, 2021 (JP) ................................ 2021-087874

(51) Int. Cl.
*G03G 9/08* (2006.01)
*G03G 9/087* (2006.01)

(52) U.S. Cl.
CPC ....... *G03G 9/0821* (2013.01); *G03G 9/08706* (2013.01); *G03G 9/08735* (2013.01); *G03G 9/08755* (2013.01)

(58) Field of Classification Search
CPC ............. G03G 9/0821; G03G 9/08706; G03G 9/08735; G03G 9/08755
See application file for complete search history.

(56) References Cited

U.S. PATENT DOCUMENTS

| | | | | |
|---|---|---|---|---|
| 9,182,694 | B2 | 11/2015 | Yamada et al. | |
| 10,082,743 | B2 | 9/2018 | Hama et al. | |
| 2006/0293436 | A1* | 12/2006 | McNeill | C08L 67/02 524/500 |
| 2014/0322643 | A1* | 10/2014 | Watanabe | G03G 9/08795 430/109.4 |

(Continued)

FOREIGN PATENT DOCUMENTS

| | | | |
|---|---|---|---|
| EP | 2 813 895 A1 | | 12/2014 |
| JP | 04257868 A | * | 9/1992 |

(Continued)

OTHER PUBLICATIONS

English machine translation of the description of JP-2007121410-A (Year: 2007).*

(Continued)

*Primary Examiner* — Mark F. Huff
*Assistant Examiner* — Boone Alexander Evans
(74) *Attorney, Agent, or Firm* — Sughrue Mion, PLLC

(57) ABSTRACT

A toner for developing an electrostatic charge image contains toner particles that contain binder resins including an amorphous resin and a crystalline resin and also contain an oligomer. The molecular weight distribution curve of the toner measured by gel permeation chromatography has its highest peak in a range of molecular weights from 5000 to 50000 and a peak or shoulder in a range of molecular weights from 500 to 5000. In a cross-sectional observation of the toner particles, domains of the crystalline resin have an average length of major axis of 100 nm or more and 1000 nm or less.

9 Claims, 2 Drawing Sheets

(56) References Cited

U.S. PATENT DOCUMENTS

| | | | |
|---|---|---|---|
| 2015/0362852 A1 | 12/2015 | Moriya et al. | |
| 2017/0168407 A1 | 6/2017 | Onishi et al. | |
| 2017/0255114 A1 | 9/2017 | Onishi et al. | |
| 2018/0059562 A1* | 3/2018 | Kadokura | G03G 9/0804 |
| 2019/0171123 A1 | 6/2019 | Ohtsu et al. | |
| 2020/0150551 A1 | 5/2020 | Kayamori et al. | |

FOREIGN PATENT DOCUMENTS

| | | | | |
|---|---|---|---|---|
| JP | 2005017593 | A | * | 1/2005 |
| JP | 2007121410 | A | * | 5/2007 |
| JP | 2014-074882 | A | | 4/2014 |
| JP | 2016019620 | A | * | 2/2016 |
| JP | 2017-003980 | A | | 1/2017 |
| JP | 2020-095269 | A | | 6/2020 |
| JP | 2020-148791 | A | | 9/2020 |

OTHER PUBLICATIONS

English machine translation of the description of JP-04257868-A (Year: 1992).*

English machine translation of the description of JP-2016019620-A (Year: 2016).*

English machine translation of the description of JP-2005017593-A (Year: 2005).*

Extended European Search Report issued Apr. 19, 2022 in European Application No. 21205916.6.

Communication dated Nov. 12, 2024 in Japanese Application No. 2021-087874.

* cited by examiner

TONER FOR DEVELOPING ELECTROSTATIC CHARGE IMAGE AND ELECTROSTATIC CHARGE IMAGE DEVELOPER

CROSS-REFERENCE TO RELATED APPLICATIONS

This application is based on and claims priority under 35 USC 119 from Japanese Patent Application No. 2021-087874 filed May 25, 2021.

BACKGROUND

(i) Technical Field

The present disclosure relates to toner for developing an electrostatic charge image and an electrostatic charge image developer.

(ii) Related Art

Electrophotography and other techniques for visualizing image information are used in various fields today. In electrophotographic visualization of image information, the surface of an image carrier is charged, and an electrostatic charge image, which is the image information, is created thereon. Then a developer, which contains toner, is applied to form a toner image on the surface of the image carrier. This toner image is transferred to a recording medium and fixed on the recording medium.

For example, Japanese Unexamined Patent Application Publication No. 2020-95269 discloses "a toner comprising: toner particles, each of the toner particles includes a binder resin and a crystalline polyester; and inorganic fine particles present on a surface of each of the toner particles, wherein a content of the crystalline polyester is from 0.5 mass parts to 20.0 mass parts per 100 mass parts of the binder resin; in a cross section of each of the toner particles: (i) the crystalline polyester is observed as domains, (ii) when, in a cross section of each of the toner particles, a sum of areas of all the domains is defined as DA, and a sum of areas of the domains present in a region surrounded by a contour of each of the toner particles and a line apart from the contour by 0.50 μm towards inside of each of the toner particles, is defined as DB, a percentage ratio of DB to DA is 10% or more, and (iii) with respect to the domains present in the region, (iii-a) the number average of lengths of a major axis of the domains is from 120 nm to 1000 nm, and (iii-b) the number average of aspect ratios of the domains is not more than 4; a dielectric constant of the inorganic fine particles, according to measurement of the dielectric constant at 25° C. and 1 MHz, is from 25 pF/m to 300 pF/m; and a coverage ratio by the inorganic fine particles on the surface of each of the toner particles is from 5% to 60%."

Japanese Unexamined Patent Application Publication No. 2014-74882 discloses "a toner, comprising: a binder resin; and a colorant, wherein the binder resin comprises: a crystalline polyester resin (A); a non-crystalline resin (B); and a composite resin (C), where the composite resin (C) comprises a condensation polymerization resin unit and an addition polymerization resin unit, wherein the toner comprises chloroform insoluble matter in an amount of 1% by mass to 30% by mass, wherein the toner has a molecular weight distribution having a main peak in a range of 1,000 to 10,000 and a half width of 15,000 or less, where the molecular weight distribution is obtained through gel permeation chromatography (GPC) of tetrahydrofuran soluble matter of the toner, and wherein the toner has an endothermic peak in a range of 90° C. to 130° C. in measurement through differential scanning calorimetry (DSC)."

Japanese Unexamined Patent Application Publication No. 2017-3980 discloses "a toner comprising toner particles containing a crystalline polyester resin and an amorphous polyester resin, wherein in cross-sectional observation of the toner by use of a transmission electron microscope (TEM), a number-average diameter (D1) of major axis lengths of the crystalline polyester resin dispersed to a depth of 0.30 μm from a toner surface is 40 nm or more and 110 nm or less; and a number-average diameter (D1) of major axis lengths of the crystalline polyester resin dispersed deeper than 0.30 μm from the toner surface is 1.25 or more and 4.00 or less times the number-average diameter (D1) of the major axis lengths of the crystalline polyester resin dispersed to the depth of 0.30 μm from the toner surface."

SUMMARY

Aspects of non-limiting embodiments of the present disclosure relate to a toner for developing an electrostatic charge image, the toner containing toner particles that contain binder resins including amorphous and crystalline resins and also contain an oligomer, and a molecular-weight distribution curve of the toner measured by gel permeation chromatography having its highest peak in a range of molecular weights from 5000 to 50000 and a peak or shoulder in a range of molecular weights from 500 to 5000. This toner, compared with ones for which domains of the crystalline resin have an average length of major axis of less than 100 nm or more than 1000 nm in a cross-sectional observation of the toner particles thereof, may be superior in fixation, even of low-coverage images, on paper and non-paper recording media.

Aspects of certain non-limiting embodiments of the present disclosure address the above advantages and/or other advantages not described above. However, aspects of the non-limiting embodiments are not required to address the advantages described above, and aspects of the non-limiting embodiments of the present disclosure may not address advantages described above.

According to an aspect of the present disclosure, there is provided a toner for developing an electrostatic charge image, the toner containing toner particles that contain binder resins including an amorphous resin and a crystalline resin and also contain an oligomer. A molecular weight distribution curve of the toner measured by gel permeation chromatography has a highest peak in a range of molecular weights from 5000 to 50000 and a peak or shoulder in a range of molecular weights from 500 to 5000, and, in a cross-sectional observation of the toner particles, domains of the crystalline resin have an average length of major axis of 100 nm or more and 1000 nm or less.

BRIEF DESCRIPTION OF THE DRAWINGS

Exemplary embodiments of the present disclosure will be described in detail based on the following figures, wherein.

DETAILED DESCRIPTION

Figure 1:
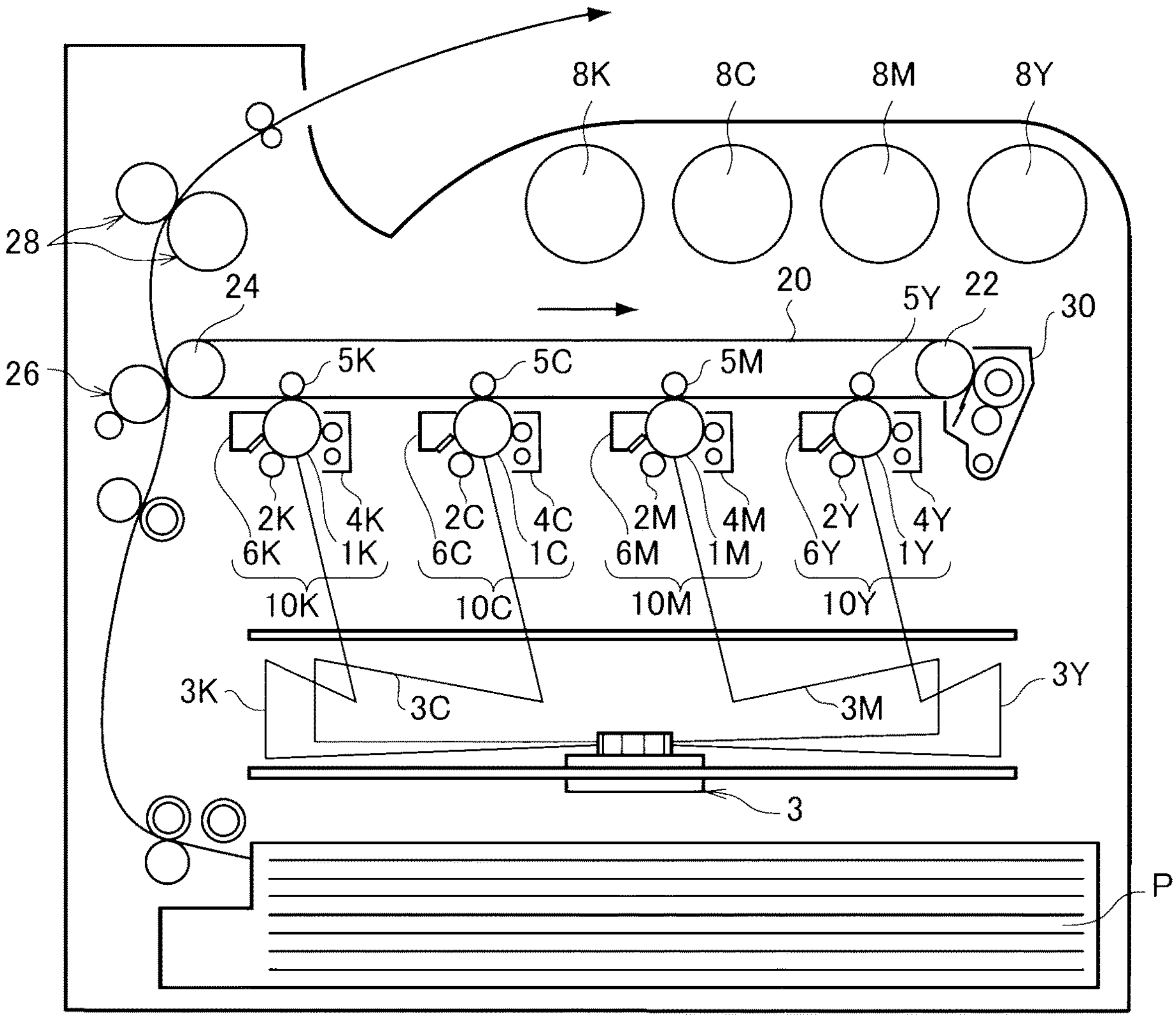
FIG. 1 is a schematic view of the structure of an example of an image forming apparatus according to an exemplary embodiment.

The following describes exemplary embodiments of the present disclosure. The following description and Examples are merely examples of the disclosure and do not limit the scope of the disclosure.

Numerical ranges specified with "A-B," "between A and B," "(from) A to B," etc., herein represent inclusive ranges, which include the minimum A and the maximum B as well as all values in between.

The following description also includes series of numerical ranges. In such a series, the upper or lower limit of a numerical range may be substituted with that of another in the same series. The upper or lower limit of a numerical range, furthermore, may be substituted with a value indicated in the Examples section.

A gerund or action noun used in relation to a certain process or method herein does not always represent an independent action. As long as its purpose is fulfilled, the action represented by the gerund or action noun may be continuous with or part of another.

A description of an exemplary embodiment herein may make reference to drawing(s). The reference, however, does not mean that what is illustrated is the only possible configuration of the exemplary embodiment. The size of elements in each drawing is conceptual; the relative sizes of the elements do not need to be as illustrated.

An ingredient herein may be a combination of multiple substances. If a composition described herein contains a combination of multiple substances as one of its ingredients, the amount of the ingredient represents the total amount of the substances in the composition unless stated otherwise.

An ingredient herein, furthermore, may be a combination of multiple kinds of particles. If a composition described herein contains a combination of multiple kinds of particles as one of its ingredients, the diameter of particles of the ingredient is that of the mixture of the multiple kinds of particles present in the composition.

"Toner for developing an electrostatic charge image" herein may be referred to simply as "toner." "An electrostatic charge image developer" herein may be referred to simply as "a developer."

Toner for Developing an Electrostatic Charge Image

First and Second Exemplary Embodiments

Toner according to a first exemplary embodiment contains toner particles that contain binder resins including an amorphous resin and a crystalline resin and also contain at least one oligomer.

A molecular weight distribution curve of the toner measured by gel permeation chromatography has its highest peak in a range of molecular weights from 5000 to 50000 and has a peak or shoulder in a range of molecular weights from 500 to 5000.

In a cross-sectional observation of the toner particles, domains of the crystalline resin have an average length of major axis of 100 nm or more and 1000 nm or less.

Toner according to a second exemplary embodiment contains toner particles that contain binder resins including an amorphous resin having a weight-average molecular weight of 6000 or more and 200000 or less and a crystalline resin having a weight-average molecular weight of 5000 or more and 45000 or less and also contain at least one oligomer having a weight-average molecular weight of 500 or more and 5000 or less.

In a cross-sectional observation of the toner particles, domains of the crystalline resin have an average length of major axis of 100 nm or more and 1000 nm or less.

Configured as described above, the toners according to the first and second exemplary embodiments may be superior in fixation, even of low-coverage images, on paper and non-paper recording media. A possible reason is as follows.

The industry has studied forming images on recording media other than paper. When toner versatility is considered, however, it would be desirable that image fixation be achieved on both paper and non-paper recording media. This is true especially when the image formed is of low coverage; in the formation of a low-coverage image, the toner needs to stay on the recording medium in separate patches.

To address this, the toner according to the first exemplary embodiment is made with toner particles that contain at least one oligomer besides binder resins including amorphous and crystalline resins. A molecular weight distribution curve of the toner measured by gel permeation chromatography, furthermore, has its highest peak in a range of molecular weights from 5000 to 50000 and a peak or shoulder in a range of molecular weights from 500 to 5000.

The toner according to the second exemplary embodiment is made with toner particles that contain at least one oligomer having a weight-average molecular weight of 500 or more and 5000 or less besides binder resins including an amorphous resin having a weight-average molecular weight of 6000 or more and 200000 or less and a crystalline resin having a weight-average molecular weight of 5000 or more and 45000 or less.

By virtue of these, in the toners according to the first and second exemplary embodiments, the oligomer, having a low molecular weight and potentially functioning as a fixing agent, tends to be present on the surface of the toner particles. The oligomer enhances the adhesion of each toner particle to the recording medium, improving the adhesion of the image not only on paper but also on non-paper recording media. Even images of low area coverage, therefore, may be fixed well on both types of recording media.

In addition, the toners according to the first and second exemplary embodiments have huge domains of crystalline resin, having an average length of major axis of 100 nm or more and 1000 nm or less. This ensures when the toner is fixed, the oligomer will melt first, and then molten crystalline resin will flow into the space left by the oligomer, making the toner's structure collapse instantly. The deformation of the toner particles, which is part of fixation, is accelerated, ensuring the toner will be fixed quickly not only on paper but also on non-paper recording media. This also may help improve the fixation of images, even of low area coverage, on both types of recording media.

Presumably for these reasons, the toners according to the first and second exemplary embodiments may be superior in fixation, even of low-coverage images, on paper and non-paper recording media.

The following describes a toner that is one according to the first exemplary embodiment while being one according to the second exemplary embodiment (hereinafter also referred to as "toner according to this exemplary embodiment") in detail. Any toner that is one according to at least one of the first or second exemplary embodiment, however, is an example of a toner according to an exemplary embodiment of the present disclosure.

The toner according to this exemplary embodiment contains toner particles. The toner may contain external additives, i.e., additives present in the toner but outside the toner particles.

Molecular Weight Curve and Weight-Average Molecular Weights

According to this exemplary embodiment, the toner particles in the toner contain binder resins including amorphous and crystalline resins and also contain at least one oligomer.

When the toner according to this exemplary embodiment is analyzed by gel permeation chromatography for molecular weight distribution, the distribution curve has its highest peak in a range of molecular weights from 5000 to 50000 and a peak or shoulder in a range of molecular weights from 500 to 5000.

The highest peak, observed in a range of molecular weights of 5000 to 50000, is a peak for the binder resins. The peak or shoulder in a range of molecular weights of 500 to 5000 is that for the oligomer.

Having such a molecular weight curve may help improve the fixation of images, both on paper and on non-paper recording media. In that case the oligomer tends to concentrate on the surface of the toner particles, allowing itself to function as a fixing agent.

The amorphous resin has a weight-average molecular weight of 6000 or more and 200000 or less. The weight-average molecular weight of the amorphous resin may be 7000 or more and 195000 or less; this may help further improve the fixation of the image. Preferably, it is 7500 or more and 190000 or less.

The crystalline resin has a weight-average molecular weight of 5000 or more and 45000 or less. The weight-average molecular weight of the crystalline resin may be 8000 or more and 45000 or less; this may help further improve the fixation of the image. Preferably, it is 8000 or more and 40000 or less.

The oligomer has a weight-average molecular weight of 500 or more and 5000 or less. The weight-average molecular weight of the oligomer may be 1000 or more and 4000 or less; this may help further improve the fixation of the image. Preferably, it is 1500 or more and 3500 or less.

Such a relationship between the weight-average molecular weights of the amorphous resin, crystalline resin, and oligomer may also help improve the fixation of images, both on paper and on non-paper recording media. In that case the oligomer tends to concentrate on the surface of the toner particles, allowing itself to function as a fixing agent.

The weight-average molecular weights Mc and Mo of the crystalline resin and the oligomer, respectively, may be such that $5 \leq Mc/Mo \leq 80$. Preferably, $6 \leq Mc/Mo \leq 50$, more preferably $7 \leq Mc/Mo \leq 30$.

Such a relationship between the weight-average molecular weights Mc and Mo of the crystalline resin and the oligomer may help improve the fixation of images, both on paper and on non-paper recording media. In that case the oligomer is more apt to concentrate on the surface of the toner particles, allowing itself to function better as a fixing agent.

The molecular weight curve and the weight-average molecular weights are those measured using a gel permeation chromatograph (GPC; HLC-8420 GPC, Tosoh) with Tosoh's TSKgel SuperHM-M column (15 cm) and tetrahydrofuran (THF) eluate. From the measured data, a molecular weight curve is constructed using monodisperse polystyrene standards. The weight-average molecular weights are calculated using the constructed molecular weight curve.

Having a peak or shoulder in a range of molecular weights from 500 to 5000 means that when the measured relationship between molecular weight and derivative by gel permeation chromatography is transformed into a relationship between molecular weight and Δderivative/Δmolecular weight, the curve reaches or goes below zero or has a minimum in a range of molecular weights between 500 and 5000.

Domains/Relative Area of Crystalline Resin

In a cross-sectional observation of the toner particles, domains of the crystalline resin have an average length of major axis of 100 nm or more and 1000 nm or less. This average length of major axis may be 150 nm or more and 500 nm or less; this may help further improve fixation on paper and non-paper recording media. Preferably, this average length of major axis is 150 nm or more and 300 nm or less.

The length of major axis of a domain of crystalline resin represents the length of the longest portion of the domain measured by observation.

In a cross-sectional observation of the toner particles, it may be that $0.1 \leq Ps/Pb \leq 0.5$, where Ps and Pb are the relative areas of the crystalline resin in the region of the toner particles from the surface to a depth of 0.30 μm and across the toner particles, respectively. Preferably, $0.1 \leq Ps/Pb \leq 0.3$, more preferably $0.2 \leq Ps/Pb \leq 0.3$.

Such a relationship between the relative areas Ps and Pb of the crystalline resin in the region of the toner particles from the surface to a depth of 0.30 μm and across the toner particles may help improve the fixation of images, not only on paper but also on non-paper recording media. In that case, the inventors believe, the oligomer will melt first when the toner is fixed, and then molten crystalline resin will flow into the space left by the oligomer, helping the toner's structure collapse instantly. As a result, the deformation of the toner particles, which is part of fixation, is accelerated.

The relative areas Ps and Pb of the crystalline resin are percentage areas relative to the particle cross-sectional area.

The cross-sectional observation of the toner particles can be as follows.

A portion of the toner particles of interest is mixed into epoxy resin, and the epoxy resin is cured. The resulting solid is sliced using an ultramicrotome (Leica Ultracut UCT) to give a thin specimen having a thickness of 80 nm or more and 130 nm or less. The specimen is stained with ruthenium tetroxide for 3 hours in a desiccator at 30° C. A STEM image (acceleration voltage, 30 kV; magnification, 20000) of the stained specimen is obtained through transmission imaging using an ultrahigh-resolution field-emission scanning electron microscope (FE-SEM; Hitachi High-Technologies S-4800).

For each toner particle, the domains therein are examined to determine, from contrast and shape, whether each of them is a domain of crystalline resin or not. In the SEM image, binder resins, rich in double bonds, appear stained darker with ruthenium tetroxide than any other material (e.g., a release agent, if used; described later herein), and amorphous resins appear stained darker than crystalline resins. By using this, one can distinguish between domains of binder resins and any other material and between domains of crystalline and amorphous resins.

To be more specific, domains of any material other than binder resins are stained the lightest with ruthenium, crystalline-resin (e.g., crystalline polyester resin) domains the second lightest, and amorphous-resin (e.g., amorphous polyester resin) domains are stained the darkest. The contrast may be adjusted to make miscellaneous domains look white, amorphous-resin domains look black, and crystalline-resin domains look light gray. Now each domain can be identified by color.

The ruthenium-stained crystalline-resin domains are then examined to determine 1) the average length of major axis of the domains of the crystalline resin, 2) the relative area Ps of the crystalline resin in the region of the toner particles from the surface to a depth of 0.30 μm, and 3) the relative area Pb of the crystalline resin across the toner particles.

Specifically, the average length of major axis of the domains of the crystalline resin is determined by measuring the length of major axis of 200 crystalline-resin domains and arithmetically averaging the measured lengths.

The relative areas Ps and Pb of the crystalline resin are determined by measuring Ps and Pb, respectively, on 100 toner particles and arithmetically averaging the measured Ps and Pb, respectively.

Melting Temperature Tc of the Crystalline Resin and Softening Temperature to of the Oligomer It may be that $10 \leq To-Tc \leq 100$, where Tc and To are the melting temperature of the crystalline resin and the softening temperature of the oligomer, respectively, both measured using a flow tester. Preferably, $30 \leq To-Tc \leq 80$, more preferably $45 \leq To-Tc \leq 80$.

Such a relationship between the melting temperature Tc of the crystalline resin and the softening temperature To of the oligomer may help improve the fixation of images, both on paper and on non-paper recording media. In that case the oligomer is more apt to concentrate on the surface of the toner particles, allowing itself to function better as a fixing agent.

The melting temperature Tc of the crystalline resin may be 55° C. or more and 115° C. or less; this may help further improve fixation on paper and non-paper recording media. Preferably, Tc is 60° C. or more and 100° C. or less, more preferably 60° C. or more and 85° C. or less.

The softening temperature To of the oligomer may be 85° C. or more and 200° C. or less for the same reason. Preferably, To is 95° C. or more and 180° C. or less, more preferably 100° C. or more and 160° C. or less.

The melting temperature Tc of the crystalline resin and the softening temperature To of the oligomer are those measured using a flow tester (Shimadzu CFT-500C) under the following conditions: preheating, 80° C./300 sec; plunger pressure, 0.980665 MPa; die size, 1 mm diameter×1 mm; rate of heating, 3.0° C./min.

The melting temperature Tc of the crystalline resin is the temperature at which the resin starts to flow.

The softening temperature To of the oligomer is a temperature intermediate between those at which the oligomer starts to melt and melts completely.

Crystalline Resin and Oligomer Content

It may be that $0.1 \leq Wc/Wo \leq 15$, where We and Wo are the crystalline resin content and oligomer content, respectively, of the toner particles. Preferably, $0.5 \leq Wc/Wo \leq 10$, more preferably $0.7 \leq Wc/Wo \leq 5$.

Such a relationship between the crystalline resin content Wc and the oligomer content Wo may help improve the fixation of images, not only on paper but also on non-paper recording media. In that case, the inventors believe, the oligomer will melt first when the toner is fixed, and then molten crystalline resin will flow into the space left by the oligomer, helping the toner's structure collapse instantly. As a result, the deformation of the toner particles, which is part of fixation, is accelerated.

The crystalline resin content Wc of the toner particles may be 2% by mass or more and 40% by mass or less; this may help further improve fixation on paper and non-paper recording media. Preferably, Wc is 3% by mass or more and 30% by mass or less, more preferably 4% by mass or more and 25% by mass or less.

The oligomer content Wo of the toner particles may be 1% by mass or more and 15% by mass or less for the same reason. Preferably, Wo is 2% by mass or more and 12% by mass or less, more preferably 3% by mass or more and 10% by mass or less.

Construction of the Toner Particles

The toner particles contain, for example, binder resins and at least one oligomer. Optionally, the toner particles may contain at least one coloring agent, a release agent, and/or other additives.

Binder Resins

The binder resins include an amorphous resin and a crystalline resin.

The ratio by mass between the amorphous and crystalline resins (crystalline/amorphous) may be 3/97 or more and 50/50 or less. Preferably, this ratio is 7/93 or more and 30/70 or less.

An amorphous resin herein represents a resin whose DSC curve, a thermal spectrum measured by differential scanning calorimetry, has no clear endothermic peak and only shows stepwise endothermic changes. An amorphous resin is solid at room temperature and thermoplasticizes at temperatures equal to or higher than its glass transition temperature.

A crystalline resin, by contrast, is a resin whose DSC curve has a clear endothermic peak rather than stepwise endothermic changes.

To take a specific example, if a crystalline resin is analyzed by DSC at a heating rate of 10° C./min, the DSC curve has an endothermic peak with a full width at half maximum (half width) of 10° C. or narrower. If an amorphous resin is analyzed likewise, the DSC curve has an endothermic peak with a half width broader than 10° C. or no clear endothermic peak.

The amorphous resin may be as described below.

Examples of amorphous resins include known amorphous resins, such as amorphous polyester resins, amorphous vinyl resins (e.g., styrene-acrylic resins), epoxy resins, polycarbonate resins, and polyurethane resins. Of these, it is preferred to use an amorphous polyester or vinyl (styrene-acrylic in particular) resin, more preferably an amorphous polyester resin.

A combination of amorphous polyester and styrene-acrylic resins may also be used. The amorphous resin may even be one that has a segment of amorphous polyester resin and a segment of styrene-acrylic resin.

Amorphous Polyester Resin

An example of an amorphous polyester resin is a polycondensate of polycarboxylic acid(s) and polyhydric alcohol(s). Either commercially available or synthesized amorphous polyester resins may be used.

Examples of polycarboxylic acids include aliphatic dicarboxylic acids (e.g., oxalic acid, malonic acid, maleic acid, fumaric acid, citraconic acid, itaconic acid, glutaconic acid, succinic acid, alkenylsuccinic acids, adipic acid, and sebacic acid), alicyclic dicarboxylic acids (e.g., cyclohexanedicarboxylic acid), aromatic dicarboxylic acids (e.g., terephthalic acid, isophthalic acid, phthalic acid, and naphthalenedicarboxylic acid), and anhydrides and lower-alkyl (e.g., C1-5 alkyl) esters thereof. Of these, aromatic dicarboxylic acids are preferred.

A combination of a dicarboxylic acid and a crosslinked or branched carboxylic acid having three or more carboxylic groups may also be used. Examples of carboxylic acids having three or more carboxylic groups include trimellitic acid, pyromellitic acid, and anhydrides and lower-alkyl (e.g., C1-5 alkyl) esters thereof.

One polycarboxylic acid may be used alone, or two or more may be used in combination.

Examples of polyhydric alcohols include aliphatic diols (e.g., ethylene glycol, diethylene glycol, triethylene glycol, propylene glycol, butanediol, hexanediol, and neopentyl glycol), alicyclic diols (e.g., cyclohexanediol, cyclohexanedimethanol, and hydrogenated bisphenol A), and aromatic diols (e.g., ethylene oxide adducts of bisphenol A and propylene oxide adducts of bisphenol A). Of these, aromatic diols and alicyclic diols are preferred, and aromatic diols are more preferred.

A combination of a diol and a crosslinked or branched polyhydric alcohol having three or more hydroxyl groups may also be used. Examples of polyhydric alcohols having three or more hydroxyl groups include glycerol, trimethylolpropane, and pentaerythritol.

One polyhydric alcohol may be used alone, or two or more may be used in combination.

An amorphous polyester resin can be produced by known methods. A specific example is to polymerize the raw materials at a temperature of 180° C. or more and 230° C. or less. The pressure in the reaction system may optionally be reduced to remove the water and alcohol that are produced as condensation proceeds. If the raw-material monomers do not dissolve or are not miscible together at the reaction temperature, a high-boiling solvent may be added as a solubilizer to make the monomers dissolve. In that case, the solubilizer is removed by distillation during the polycondensation. Any monomer not miscible with the other(s) may be condensed with the planned counterpart acid(s) or alcohol(s) before the polycondensation process.

Besides native amorphous polyester resins, modified amorphous polyester resins may also be used. A modified amorphous polyester resin is an amorphous polyester resin having a non-ester linking group or containing a non-polyester resin component bound by covalent, ionic, or any other form of bonding. An example is a terminally modified resin obtained by reacting a terminally functionalized amorphous polyester resin, for example having a terminal isocyanate group, with an active hydrogen compound.

The amorphous polyester resin may constitute 60% by mass or more and 98% by mass or less of all binder resins. Preferably, the amorphous polyester resin constitutes 65% by mass or more and 95% by mass or less, more preferably 70% by mass or more and 90% by mass or less, of all binder resins.

Styrene-Acrylic Resin

A styrene-acrylic resin is a copolymer of at least a styrene monomer (monomer having the styrene structure) and a (meth)acrylic monomer (monomer having a (meth)acrylic group, preferably a (meth)acryloxy group). Examples of styrene-acrylic resins include copolymers of a styrene monomer and a (meth)acrylate monomer.

A styrene-acrylic resin has an acrylic-resin substructure formed by the polymerization of an acrylic monomer, methacrylic monomer, or both. The expression "(meth)acrylic" encompasses both "acrylic" and "methacrylic," and the expression "(meth)acrylate" encompasses both an "acrylate" and a "methacrylate."

Examples of styrene monomers include styrene, α-methylstyrene, meta-chlorostyrene, para-chlorostyrene, para-fluorostyrene, para-methoxystyrene, meta-tert-butoxystyrene, para-tert-butoxystyrene, para-vinylbenzoic acid, and para-methyl-α-methylstyrene. One styrene monomer may be used alone, or two or more may be used in combination.

Examples of (meth)acrylic monomers include (meth) acrylic acid, methyl (meth)acrylate, ethyl (meth)acrylate, n-propyl (meth)acrylate, isopropyl (meth)acrylate, n-butyl (meth)acrylate, isobutyl (meth)methacrylate, n-hexyl (meth) acrylate, 2-ethylhexyl (meth)acrylate, lauryl (meth)acrylate, stearyl (meth)acrylate, cyclohexyl (meth)acrylate, dicyclopentanyl (meth)acrylate, isobornyl (meth)acrylate, 2-hydroxyethyl (meth)acrylate, hydroxypropyl (meth)acrylate, and 4-hydroxybutyl (meth)acrylate. One (meth)acrylic monomer may be used alone, or two or more may be used in combination.

The ratio between the styrene and (meth)acrylic monomers in the polymerization may be between 70:30 and 95:5 (styrene:(meth)acrylic) on a mass basis.

A crosslinked styrene-acrylic resin may also be used. An example is a copolymer of at least a styrene monomer, a (meth)acrylic monomer, and a crosslinking monomer. The crosslinking monomer can be of any kind, but an example is a (meth)acrylate compound having two or more functional groups.

How to produce the styrene-acrylic resin is not critical. Techniques such as solution polymerization, precipitation polymerization, suspension polymerization, bulk polymerization, and emulsion polymerization can be used. The polymerization reactions can be done by known processes (batch, semicontinuous, continuous, etc.).

The styrene-acrylic resin may constitute 0% by mass or more and 20% by mass or less of all binder resins. Preferably, the styrene-acrylic resin constitutes 1% by mass or more and 15% by mass or less, more preferably 2% by mass or more and 10% by mass or less, of all binder resins.

Amorphous Resin Having a Segment of Amorphous Polyester Resin and a Segment of Styrene-Acrylic Resin (hereinafter also referred to as "hybrid amorphous resin")

A hybrid amorphous resin is an amorphous resin having a segment of amorphous polyester resin and a segment of styrene-acrylic resin chemically bound together.

Examples of hybrid amorphous resins include resins having a polyester backbone and styrene-acrylic side chains chemically bound to the backbone; resins having a styrene-acrylic backbone and polyester side chains chemically bound to the backbone; resins whose backbone is formed by polyester and styrene-acrylic resins chemically bound together; and resins having a backbone formed by polyester and styrene-acrylic resins chemically bound together and polyester and/or styrene-acrylic side chains chemically bound to the backbone.

The amorphous polyester and styrene-acrylic resins in each segment are not described; they are as described above.

The combined percentage of the polyester and styrene-acrylic segments to the hybrid amorphous resin as a whole may be 80% by mass or more. Preferably, this percentage is 90% by mass or more, more preferably 95% by mass or more, even more preferably 100% by mass.

In a hybrid amorphous resin, the percentage of the styrene-acrylic-resin segment to the polyester and styrene-acrylic segments combined may be 20% by mass or more and 60% by mass or less. Preferably, this percentage is 25% by mass or more and 55% by mass or less, more preferably 30% by mass or more and 50% by mass or less.

A hybrid amorphous resin may be produced by any of methods (i) to (iii) below.

(i) The polyester segment is produced by polycondensation between polyhydric alcohol(s) and polycarboxylic acid(s). Then the monomer that will form the styrene-acrylic segment is polymerized by addition polymerization.

(ii) The styrene-acrylic segment is produced by addition polymerization of a monomer capable of this type of polymerization. Then polyhydric alcohol(s) and polycarboxylic acid(s) are polycondensed.

(iii) Polyhydric alcohol(s) and polycarboxylic acid(s) are polycondensed, and a monomer capable of addition polymerization is polymerized by addition polymerization at the same time.

The hybrid amorphous resin may constitute 60% by mass or more and 98% by mass or less of all binder resins. Preferably, the hybrid amorphous resin constitutes 65% by mass or more and 95% by mass or less, more preferably 70% by mass or more and 90% by mass or less, of all binder resins.

Some characteristics of the amorphous resin may be as follows.

The glass transition temperature (Tg) of the amorphous resin may be 50° C. or more and 80° C. or less. Preferably, Tg is 50° C. or more and 65° C. or less.

This glass transition temperature is that determined from the DSC curve of the resin, which is measured by differential scanning calorimetry (DSC). More specifically, this glass transition temperature is the "extrapolated initial temperature of glass transition" as in the methods for determining glass transition temperatures set forth in JIS K 7121: 1987 "Testing Methods for Transition Temperatures of Plastics."

The crystalline resin may be as described below.

Examples of crystalline resins include known crystalline resins, such as crystalline polyester resins and crystalline vinyl resins (e.g., polyalkylene resins and long-chain alkyl (meth)acrylate resins). Of these, it is preferred to use a crystalline polyester resin; this may improve the mechanical strength and fixation at low temperatures of the toner.

Crystalline Polyester Resin

An example of a crystalline polyester resin is a polycondensate of polycarboxylic acid(s) and polyhydric alcohol(s). Either commercially available or synthesized crystalline polyester resins may be used.

Crystalline polyester resins made with linear aliphatic polymerizable monomers form a crystal structure more easily than those made with aromatic polymerizable monomers.

Examples of polycarboxylic acids include aliphatic dicarboxylic acids (e.g., oxalic acid, succinic acid, glutaric acid, adipic acid, suberic acid, azelaic acid, sebacic acid, 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid), aromatic dicarboxylic acids (e.g., dibasic acids, such as phthalic acid, isophthalic acid, terephthalic acid, and naphthalene-2,6-dicarboxylic acid), and anhydrides and lower-alkyl (e.g., C1-5 alkyl) esters thereof.

A combination of a dicarboxylic acid and a crosslinked or branched carboxylic acid having three or more carboxylic groups may also be used. Examples of carboxylic acids having three or more carboxylic groups include aromatic carboxylic acids (e.g., 1,2,3-benzenetricarboxylic acid, 1,2,4-benzenetricarboxylic acid, and 1,2,4-naphthalenetricarboxylic acid) and anhydrides and lower-alkyl (e.g., C1-5 alkyl) esters thereof.

A combination of a dicarboxylic acid such as listed above and a dicarboxylic acid having a sulfonic acid group or an ethylenic double bond may also be used.

One polycarboxylic acid may be used alone, or two or more may be used in combination.

Examples of polyhydric alcohols include aliphatic diols (e.g., C7-20 linear aliphatic diols). Examples of aliphatic diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,11-undecanediol, 1,12-dodecanediol, 1,13-tridecanediol, 1,14-tetradecanediol, 1,18-octadecanediol, and 1,14-eicosanedecanediol. Of these, 1,8-octanediol, 1,9-nonanediol, and 1,10-decanediol are preferred.

A combination of a diol and a crosslinked or branched alcohol having three or more hydroxyl groups may also be used. Examples of alcohols having three or more hydroxyl groups include glycerol, trimethylolethane, trimethylolpropane, and pentaerythritol.

One polyhydric alcohol may be used alone, or two or more may be used in combination.

In the polyhydric alcohol(s), the percentage of aliphatic diols may be 80 mol % or more. Preferably, the percentage of aliphatic diols is 90 mol % or more.

A crystalline polyester resin can be produced by known methods, for example in the same way as an amorphous polyester resin.

The crystalline polyester resin may be a polymer formed by linear aliphatic α,ω-dicarboxylic acid(s) and linear aliphatic α,ω-diol(s).

The linear aliphatic α,ω-dicarboxylic acid(s) may be one(s) having a C3 to C14 alkylene group between the two carboxy groups. Preferably, the number of carbon atoms in the alkylene group is 4 or more and 12 or less, more preferably 6 or more and 10 or less.

Examples of linear aliphatic α,ω-dicarboxylic acids include succinic acid, glutaric acid, adipic acid, 1,6-hexanedicarboxylic acid (commonly known as suberic acid), 1,7-heptanedicarboxylic acid (commonly known as azelaic acid), 1,8-octanedicarboxylic acid (commonly known as sebacic acid), 1,9-nonanedicarboxylic acid, 1,10-decanedicarboxylic acid, 1,12-dodecanedicarboxylic acid, 1,14-tetradecanedicarboxylic acid, and 1,18-octadecanedicarboxylic acid. Of these, 1,6-hexanedicarboxylic acid, 1,7-heptanedicarboxylic acid, 1,8-octanedicarboxylic acid, 1,9-nonanedicarboxylic acid, and 1,10-decanedicarboxylic acid are preferred.

One linear aliphatic α,ω-dicarboxylic acid may be used alone, or two or more may be used in combination.

The linear aliphatic α,ω-diol(s) may be one(s) having a C3 to C14 alkylene group between the two hydroxy groups. Preferably, the number of carbon atoms in the alkylene group is 4 or more and 12 or less, more preferably 6 or more and 10 or less.

Examples of linear aliphatic α,ω-diols include ethylene glycol, 1,3-propanediol, 1,4-butanediol, 1,5-pentanediol, 1,6-hexanediol, 1,7-heptanediol, 1,8-octanediol, 1,9-nonanediol, 1,10-decanediol, 1,12-dodecanediol, 1,14-tetradecanediol, and 1,18-octadecanediol. Of these, 1,6-hexanediol, 1,7-heptanediol, 1,8-octanediol, 1,9-nonanediol, and 1,10-decanediol are preferred.

One linear aliphatic α,ω-diol may be used alone, or two or more may be used in combination.

Preferably, the polymer, formed by linear aliphatic α,ω-dicarboxylic acid(s) and linear aliphatic α,ω-diol(s), is formed by at least one selected from the group consisting of 1,6-hexanedicarboxylic acid, 1,7-heptanedicarboxylic acid, 1,8-octanedicarboxylic acid, 1,9-nonanedicarboxylic acid, and 1,10-decanedicarboxylic acid and at least one selected from the group consisting of 1,6-hexanediol, 1,7-heptanediol, 1,8-octanediol, 1,9-nonanediol, and 1,10-decanediol, more preferably by 1,10-decanedicarboxylic acid and 1,6-hexanediol.

The binder resin content may be 40% by mass or more and 95% by mass or less of the toner particles as a whole. Preferably, the binder resin content is 50% by mass or more and 90% by mass or less, more preferably 60% by mass or more and 85% by mass or less.

Oligomer

Examples of oligomers include rosin derivatives, terpene resins, petroleum resins, phenolic resins, coumarone-indene resins, and xylene resins.

Oligomers containing styrene as a repeating unit, specifically C9 petroleum resins, may improve the fixation of images on paper and non-paper recording media.

C9 petroleum resins are obtained by steam-cracking feedstock petroleum in an ethylene plant and polymerizing the diolefins and monoolefins in the fractions without separation and are made from the C9 fraction of cracked petroleum. C9 petroleum resins are primarily copolymers of styrene, vinyl toluene, α-methylstyrene, and indene. In this context, a resin being primarily something means the substance is the component most abundant in the resin.

Examples of rosin derivatives include the following.

Esters of native or modified rosin and an alcohol (rosin esters)

Native or modified rosin modified with an unsaturated fatty acid (unsaturated fatty acid-modified rosin)

Rosin esters modified with an unsaturated fatty acid (unsaturated fatty acid-modified rosin esters)

Carboxy-reduced derivatives of native rosin, modified rosin, unsaturated fatty acid-modified rosin, and unsaturated fatty acid-modified rosin esters (rosin alcohols)

Metal salts of native rosin, modified rosin, and the rosin derivatives listed above Native rosin, modified rosin, and the rosin derivatives listed above modified by acid-catalyzed addition or thermal polymerization of phenol (rosin-phenolic resins)

Examples of types of native rosin include raw rosins, such as tall oil rosin, gum rosin, and wood rosin. Examples of types of modified rosin include those obtained by modifying native rosin by hydrogenation, disproportionation, polymerization, etc.

One oligomer may be used alone, or two or more may be used in combination.

Coloring Agent

Examples of coloring agents include pigments, such as carbon black, chrome yellow, Hansa yellow, benzidine yellow, threne yellow, quinoline yellow, pigment yellow, permanent orange GTR, pyrazolone orange, Vulcan orange, Watchung red, permanent red, brilliant carmine 3B, brilliant carmine 6B, DuPont oil red, pyrazolone red, lithol red, rhodamine B lake, lake red C, pigment red, rose bengal, aniline blue, ultramarine blue, Calco oil blue, methylene blue chloride, phthalocyanine blue, pigment blue, phthalocyanine green, and malachite green oxalate; and dyes, such as acridine, xanthene, azo, benzoquinone, azine, anthraquinone, thioindigo, dioxazine, thiazine, azomethine, indigo, phthalocyanine, aniline black, polymethine, triphenylmethane, diphenylmethane, and thiazole dyes.

One coloring agent may be used alone, or two or more may be used in combination.

Surface-treated coloring agents may optionally be used. A combination of a coloring agent and a dispersant may also be used. It is also possible to use multiple coloring agents in combination.

The coloring agent content may be 1% by mass or more and 30% by mass or less of the toner particles as a whole. Preferably, the coloring agent content is 3% by mass or more and 15% by mass or less.

Release Agent

Examples of release agents include hydrocarbon waxes; natural waxes, such as carnauba wax, rice wax, and candelilla wax; synthesized or mineral/petroleum waxes, such as montan wax; and ester waxes, such as fatty acid esters and montanates. Other release agents may also be used.

The melting temperature of the release agent may be 50° C. or more and 110° C. or less. Preferably, the melting temperature is 60° C. or more and 100° C. or less.

The melting temperature of the release agent is the "peak melting temperature" of the agent as in the methods for determining melting temperatures set forth in JIS K 7121: 1987 "Testing Methods for Transition Temperatures of Plastics" and is determined from the DSC curve of the agent, which is measured by differential scanning calorimetry (DSC).

The release agent content may be 1% by mass or more and 20% by mass or less of the toner particles as a whole. Preferably, the release agent content is 5% by mass or more and 15% by mass or less.

Other Additives

Examples of other additives include known additives, such as magnetic substances, charge control agents, and inorganic powders. Such additives, if used, are contained in the toner particles as internal additives.

Characteristics of the Toner Particles

The toner particles may be single-layer toner particles or may be "core-shell" toner particles, i.e., toner particles formed by a core (core particle) and a coating that covers the core (shell layer).

A possible structure of core-shell toner particles is one in which the core contains the binder resins together with the coloring agent, release agent, and/or other additives if used, and the coating contains the binder resins.

The volume-average diameter of the toner particles (D50v) may be 2 μm or more and 10 μm or less. Preferably, D50v is 4 μm or more and 8 μm or less.

The average diameters and geometric standard deviations of toner particles indicated herein are those measured using Coulter Multisizer II (Beckman Coulter) and ISOTON-II electrolyte (Beckman Coulter).

For measurement, a sample of the toner particles, 0.5 mg or more and 50 mg or less, is added to 2 ml of a 5% by mass aqueous solution of a surfactant as a dispersant (e.g., a sodium alkylbenzene sulfonate). The resulting dispersion is added to 100 ml or more and 150 ml or less of the electrolyte.

The electrolyte with the suspended sample therein is sonicated for 1 minute using a sonicator, and the size distribution is measured on 50000 sampled particles within a diameter range of 2 μm to 60 μm using Coulter Multisizer II with an aperture size of 100 μm.

The measured distribution is divided into segments by particle size (channels), and the cumulative distribution of volume and that of frequency are plotted starting from the smallest diameter. The particle diameter at which the cumulative volume is 16% and that at which the cumulative frequency is 16% are defined as volume diameter D16v and number diameter D16p, respectively, of the toner particles. The particle diameter at which the cumulative volume is 50% and that at which the cumulative frequency is 50% are defined as the volume-average diameter D50v and cumulative number-average diameter D50p, respectively, of the toner particles. The particle diameter at which the cumulative volume is 84% and that at which the cumulative frequency is 84% are defined as volume diameter D84v and number diameter D84p, respectively, of the toner particles.

These are used to calculate the geometric standard deviation by volume (GSDv) and geometric standard deviation by number (GSDp). GSDv is given by $(D84v/D16v)^{1/2}$, and GSDp is given by $(D84p/D16p)^{1/2}$.

The average circularity of the toner particles may be 0.94 or more and 1.00 or less. Preferably, the average circularity is 0.95 or more and 0.98 or less.

The average circularity of the toner particles is given by (circumference of the equivalent circle)/(circumference) [(circumference of circles having the same projected area as particle images)/(circumference of projected images of the particles)]. Specifically, the average circularity of the toner particles can be measured as follows.

A portion of the toner particles of interest is collected by aspiration in such a manner that it will form a flat stream. This flat stream is photographed with a flash to capture the figures of the particles in a still image. The images of 3500 sampled particles are analyzed using a flow particle-image analyzer (Sysmex FPIA-3000), and the average circularity is determined from the results.

If the toner contains external additives, the external additives are removed beforehand by dispersing the toner (developer) of interest in water containing a surfactant and then sonicating the resulting dispersion.

External Additives

An example of an external additive is inorganic particles. Examples of inorganic particles include particles of $SiO_2$, $TiO_2$, $Al_2O_3$, CuO, ZnO, $SnO_2$, $CeO_2$, $Fe_2O_3$, MgO, BaO, CaO, $K_2O$, $Na_2O$, $ZrO_2$, $CaO \cdot SiO_2$, $K_2O \cdot (TiO_2)_n$, $Al_2O_3 \cdot 2SiO_2$, $CaCO_3$, $MgCO_3$, $BaSO_4$, and $MgSO_4$.

The surface of the inorganic particles may be hydrophobic, for example as a result of being immersed in a hydrophobizing agent. The hydrophobizing agent can be of any kind, but examples include silane coupling agents, silicone oil, titanate coupling agents, and aluminum coupling agents. One such agent may be used alone, or two or more may be used in combination. The amount of the hydrophobizing agent is usually, for example, 1 part by mass or more and 10 parts by mass or less per 100 parts by mass of the inorganic particles.

Materials like resin particles (particles of polystyrene, polymethyl methacrylate, melamine resins, etc.) and active cleaning agents (e.g., metal salts of higher fatty acids, typically zinc stearate, and particles of fluoropolymers) are also examples of external additives.

The percentage of external additives may be 0.01% by mass or more and 5% by mass or less of the toner particles. Preferably, this percentage is 0.01% by mass or more and 2.0% by mass or less.

Production of the Toner

Toner according to this exemplary embodiment can be obtained by producing the toner particles and then adding external additives.

The toner particles can be produced either by a dry process (e.g., kneading and milling) or by a wet process (e.g., aggregation and coalescence, suspension polymerization, or dissolution and suspension). Any known dry or wet process may be used to produce the toner particles.

The following describes an example of how to produce the toner particles by kneading and milling by way of example.

Kneading and milling is a process for producing toner particles in which, for example, binder resins including amorphous and crystalline resins and an oligomer are melted and kneaded together, the kneaded mixture is milled, and then the milled product is classified. The process includes, for example, kneading, in which ingredients including binder resins and an oligomer are melted and kneaded together; cooling, in which the molten mixture is cooled; milling, in which the cooled mixture is milled; and classification, in which the milled product is classified.

The following describes the details of kneading-and-milling production of the toner particles.

Kneading

Ingredients including binder resins and an oligomer are melted and kneaded together. The binder resins include amorphous and crystalline resins.

Examples of kneaders that can be used include three-roll, single-screw, twin-screw, and Banbury-mixer kneaders.

The temperature at which the materials are melted can be determined according to the binder resins and oligomer used, their proportions, etc.

Cooling

The kneaded mixture is then cooled.

For example, the mixture is cooled from its temperature at the end of kneading to 40° C. or below at an average rate of 15° C./sec or slower. This may help domains of crystalline resin grow well in the kneaded mixture.

The average rate in this context is the average speed of cooling of the kneaded mixture from its temperature at the end of kneading to 40° C.

An example of a method for cooling is the use of a combination of rollers and a belt therebeneath with circulating cold water or brine. If this method is used, the rate of cooling is determined by the speed of the rollers, the flow rate of the water or brine, the supply rate of the kneaded mixture, the thickness of the slab on which the mixture is rolled, etc.

Milling

The cooled mixture is then milled into particles, for example using a mechanical mill or jet mill.

Before being milled, the mixture may be warmed to a temperature not exceeding the melting point of the crystalline resin (below the melting temperature of the crystalline resin; e.g., the melting temperature minus 15° C.). This may help domains of crystalline resin grow well in the mixture.

Classification

The milled product (particles) may optionally be classified to give the toner particles the desired average diameter.

A centrifugal, inertial, or any other commonly used classifier is used to eliminate undersized powder (particles smaller than the desired range of diameters) and oversized powder (particles larger than the desired range of diameters).

Hot-Air Blow

The classified particles may be blown with hot air to give the toner particles the desired circularity.

In this way, toner particles in which domains of crystalline resin have an average length of major axis of 100 nm or more and 1000 nm or less are obtained.

Then toner according to this exemplary embodiment is produced, for example by adding external additives while the toner particles are dry, and mixing them together. The mixing can be performed using, for example, a V-blender, Henschel mixer, or Lödige mixer. Optionally, oversized particles of toner may be removed, for example using a vibrating sieve or air-jet sieve.

Electrostatic Charge Image Developer

An electrostatic charge image developer according to an exemplary embodiment contains at least toner according to any of the above exemplary embodiments.

The electrostatic charge image developer according to this exemplary embodiment may be a one-component developer, which is substantially toner according to any of the above exemplary embodiments, or may be a two-component developer, which is a mixture of the toner and a carrier.

The carrier can be of any kind and can be a known one. Examples include a coated carrier, formed by a core magnetic powder and a coating resin on its surface; a magnetic powder-dispersed carrier, formed by a matrix resin and a magnetic powder dispersed therein; and a resin-impregnated carrier, which is a porous magnetic powder impregnated with resin.

The particles as a component of a magnetic powder-dispersed or resin-impregnated carrier can serve as the core material; a carrier obtained by coating the surface of them with resin may also be used.

The magnetic powder can be, for example, a powder of a magnetic metal, such as iron, nickel, or cobalt, or a powder of a magnetic oxide, such as ferrite or magnetite.

The coating or matrix resin can be, for example, polyethylene, polypropylene, polystyrene, polyvinyl acetate, polyvinyl alcohol, polyvinyl butyral, polyvinyl chloride, polyvinyl ether, polyvinyl ketone, a vinyl chloride-vinyl acetate copolymer, a styrene-acrylate copolymer, a straight silicone resin (resin having organosiloxane bonds) or its modified form, a fluoropolymer, polyester, polycarbonate, a phenolic resin, or an epoxy resin.

The coating or matrix resin may contain additives, such as electrically conductive particles.

Examples of electrically conductive particles include particles of metal, such as gold, silver, or copper, and particles of carbon black, titanium oxide, zinc oxide, tin oxide, barium sulfate, aluminum borate, and potassium titanate.

The resin coating of the surface of the core material can be achieved by, for example, coating the surface with a coating-layer solution prepared by dissolving the coating resin in a solvent, optionally with additives. The solvent can be of any kind and can be selected considering, for example, the coating resin used and suitability for coating.

Specific examples of how to provide the resin coating include dipping, i.e., immersing the core material in the coating-layer solution; spraying, i.e., applying a mist of the coating-layer solution onto the surface of the core material; fluidized bed coating, i.e., applying a mist of the coating-layer solution to core material floated on a stream of air; and kneader-coater coating, i.e., mixing the carrier core material and the coating-layer solution in a kneader-coater and removing the solvent.

If the developer is two-component, the mix ratio (by mass) between the toner and the carrier may be between 1:100 (toner:carrier) and 30:100. Preferably, the mix ratio is between 3:100 and 20:100.

Image Forming Apparatus/Image Forming Method

The following describes an image forming apparatus/image forming method according to an exemplary embodiment.

An image forming apparatus according to this exemplary embodiment includes an image carrier; a charging component that charges the surface of the image carrier; an electrostatic charge image creating component that creates an electrostatic charge image on the charged surface of the image carrier; a developing component that contains an electrostatic charge image developer and develops, using the electrostatic charge image developer, the electrostatic charge image on the surface of the image carrier to form a toner image; a transfer component that transfers the toner image on the surface of the image carrier to the surface of a recording medium; and a fixing component that fixes the toner image on the surface of the recording medium. The electrostatic charge image developer is an electrostatic charge developer according to the above exemplary embodiment.

The image forming apparatus according to this exemplary embodiment performs an image forming method that includes charging the surface of an image carrier; creating an electrostatic charge image on the charged surface of the image carrier; developing, using an electrostatic charge image developer according to the above exemplary embodiment, the electrostatic charge image on the surface of the image carrier to form a toner image; transferring the toner image on the surface of the image carrier to the surface of a recording medium; and fixing the toner image on the surface of the recording medium (image forming method according to this exemplary embodiment).

The configuration of the image forming apparatus according to this exemplary embodiment can be applied to well-known types of image forming apparatuses. Examples include a direct-transfer image forming apparatus, which forms a toner image on the surface of an image carrier and transfers it directly to a recording medium; an intermediate-transfer image forming apparatus, which forms a toner image on the surface of an image carrier, transfers it to the surface of an intermediate transfer body (first transfer), and then transfers the toner image on the surface of the intermediate transfer body to the surface of a recording medium (second transfer); an image forming apparatus having a cleaning component that cleans the surface of the image carrier between the transfer of the toner image and charging; and an image forming apparatus having a static eliminator that removes static electricity from the surface of the image carrier by irradiating the surface with antistatic light between the transfer of the toner image and charging.

The transfer component of an intermediate-transfer apparatus may include, for example, an intermediate transfer body, a first transfer component, and a second transfer component. The toner image formed on the surface of the image carrier is transferred to the surface of the intermediate transfer body by the first transfer component (first transfer), and then the toner image on the surface of the intermediate transfer body is transferred to the surface of a recording medium by the second transfer component (second transfer).

Part of the image forming apparatus according to this exemplary embodiment, e.g., a portion including the developing component, may have a cartridge structure, i.e., a structure that allows the part to be detached from and attached to the image forming apparatus (or may be a process cartridge). An example of a process cartridge is one that includes a developing component that contains an electrostatic charge image developer according to the above exemplary embodiment.

The following describes an example of an image forming apparatus according to this exemplary embodiment. This is not the only possible form. Some of its structural elements are described with reference to a drawing.

FIG. 1 is a schematic view of the structure of an image forming apparatus according to this exemplary embodiment.

The image forming apparatus illustrated in FIG. 1 includes first to fourth electrophotographic image forming units 10Y, 10M, 10C, and 10K (image forming component) that produce images in the colors of yellow (Y), magenta (M), cyan (C), and black (K), respectively, based on color-separated image data. These image forming units (hereinafter also referred to simply as "units") 10Y, 10M, 10C, and 10K are arranged in a horizontal row with a predetermined distance therebetween. The units 10Y, 10M, 10C, and 10K may be process cartridges, i.e., units that can be detached from and attached to the image forming apparatus.

Above the units 10Y, 10M, 10C, and 10K in the drawing, an intermediate transfer belt 20 as an intermediate transfer body extends to pass through each of the units. The intermediate transfer belt 20 is wound over a drive roller 22 (right in the drawing) and a support roller 24 (left in the drawing) spaced apart from each other, with the rollers touching the inner surface of the intermediate transfer belt 20, and is driven by them to run in the direction from the first unit 10Y to the fourth unit 10K. The support roller 24 is forced by a spring or similar mechanism, not illustrated in the drawing, to go away from the drive roller 22, thereby placing tension on the intermediate transfer belt 20 wound over the two rollers. On the image-carrying side of the intermediate transfer belt 20 is a cleaning device 30 for the intermediate transfer belt 20 facing the drive roller 22.

The units 10Y, 10M, 10C, and 10K have developing devices (developing component) 4Y, 4M, 4C, and 4K, to which four toners in the colors of yellow, magenta, cyan, and black, respectively, are delivered from toner cartridges 8Y, 8M, 8C, and 8K.

The first to fourth units 10Y, 10M, 10C, and 10K are equivalent in structure. In the following, the first unit 10Y, located upstream of the others in the direction of running of the intermediate transfer belt 20 and forms a yellow image, is described to represent the four units. The second to fourth units 10M, 10C, and 10K are not described; they have structural elements equivalent to those of the first unit 10Y, and these elements are designated with the same numerals as in the first unit 10Y but with the letters M (for magenta), C (for cyan), and K (for black), respectively, in place of Y (for yellow).

The first unit 10Y has a photoreceptor 1Y that acts as an image carrier. Around the photoreceptor 1Y are a charging roller (example of a charging component) 2Y that charges the surface of the photoreceptor 1Y to a predetermined potential; an exposure device (example of an electrostatic charge image creating component) 3 that irradiates the charged surface with a laser beam 3Y produced on the basis of a color-separated image signal to create an electrostatic charge image there; a developing device (example of a developing component) 4Y that supplies charged toner to the electrostatic charge image to develop the electrostatic charge image; a first transfer roller (example of a first transfer component) 5Y that transfers the developed toner image to the intermediate transfer belt 20; and a photoreceptor cleaning device (example of a cleaning component) 6Y that removes residual toner off the surface of the photoreceptor 1Y after the first transfer, arranged in this order.

The first transfer roller 5Y is inside the intermediate transfer belt 20 and faces the photoreceptor 1Y. Each of the first transfer rollers 5Y, 5M, 5C, and 5K is connected to a bias power supply (not illustrated) that applies a first transfer bias to the roller. Each bias power supply is controlled by a controller, not illustrated in the drawing, to change the magnitude of the transfer bias it applies to the corresponding first transfer roller.

The operation of forming a yellow image at the first unit 10Y may be as described below.

First, before the operation, the charging roller 2Y charges the surface of the photoreceptor 1Y to a potential of −600 V to −800 V.

The photoreceptor 1Y is a stack of an electrically conductive substrate (e.g., having a volume resistivity at 20° C. of $1\times10^{-6}$ Ωcm or less) and a photosensitive layer thereon. The photosensitive layer is of high electrical resistance (has the typical resistance of resin) in its normal state, but when it is irradiated with a laser beam 3Y, the resistivity of the irradiated portion changes. Thus, a laser beam 3Y is emitted using the exposure device 3 onto the charged surface of the photoreceptor 1Y in accordance with data for the yellow image sent from a controller, not illustrated in the drawing. The laser beam 3Y hits the photosensitive layer on the surface of the photoreceptor 1Y, creating an electrostatic charge image as a pattern for the yellow image on the surface of the photoreceptor 1Y.

The electrostatic charge image is an image created on the surface of the photoreceptor 1Y by electrical charging and is a so-called negative latent image, created after the charge on the surface of the photoreceptor 1Y flows away in the irradiated portion of the photosensitive layer as a result of a resistivity decrease caused by the exposure to the laser beam 3Y but stays in the portion of the photosensitive layer not irradiated with the laser beam 3Y.

As the photoreceptor 1Y rotates, the electrostatic charge image created on the photoreceptor 1Y is moved to a predetermined development point. At this development point, the electrostatic charge image on the photoreceptor 1Y is visualized (developed) as a toner image by the developing device 4Y.

Inside the developing device 4Y is an electrostatic charge image developer that contains, for example, at least yellow toner and a carrier. The yellow toner is on a developer roller (example of a developer carrier) and has been triboelectrically charged with the same polarity as the charge on the photoreceptor 1Y (negative) as a result of being stirred inside the developing device 4Y. As the surface of the photoreceptor 1Y passes through the developing device 4Y, the yellow toner electrostatically adheres to the uncharged, latent-image portion of the surface of the photoreceptor 1Y and develops the latent image. The photoreceptor 1Y, now having a yellow toner image thereon, then continues rotating at a predetermined speed, transporting the toner image developed thereon to a predetermined first transfer point.

After the arrival of the yellow toner image on the photoreceptor 1Y at the first transfer point, a first transfer bias is applied to the first transfer roller 5Y. An electrostatic force acts on the toner image in the direction from the photoreceptor 1Y toward the first transfer roller 5Y, causing the toner image to be transferred from the photoreceptor 1Y to the intermediate transfer belt 20. The applied transfer bias has the (+) polarity, opposite the polarity of the toner (−), and its amount has been controlled by a controller (not illustrated). For the first unit 10Y, for example, it has been controlled to +10 μA.

Residual toner on the photoreceptor 1Y is removed and collected at the photoreceptor cleaning device 6Y.

The first transfer biases applied to the first transfer rollers 5M, 5C, and 5K of the second, third, and fourth units 10M, 10C, and 10K have also been controlled in the same way as that at the first unit 10Y.

The intermediate transfer belt 20 to which a yellow toner image has been transferred at the first unit 10Y in this way is then transported passing through the second to fourth units 10M, 10C, and 10K sequentially. Toner images in the respective colors are overlaid, completing multilayer transfer.

The intermediate transfer belt 20 that has passed through the first to fourth units and thereby completed multilayer transfer of toner images in four colors then reaches a second transfer section. The second transfer section is formed by the intermediate transfer belt 20, the support roller 24, which touches the inner surface of the intermediate transfer belt 20, and a second transfer roller (example of a second transfer component) 26, which is on the image-carrying side of the intermediate transfer belt 20. Recording paper (example of a recording medium) P is fed to the point of contact between the second transfer roller 26 and the intermediate transfer belt 20 in a timed manner by a feeding mechanism, and a second transfer bias is applied to the support roller 24. The applied transfer bias has the (−) polarity, the same as the polarity of the toner (−). An electrostatic force acts on the toner image in the direction from the intermediate transfer belt 20 toward the recording paper P, causing the toner image to be transferred from the intermediate transfer belt 20 to the recording paper P. The amount of the second transfer bias has been controlled and is determined in accordance with the resistance detected by a resistance detector (not illustrated) that detects the electrical resistance of the second transfer section.

After that, the recording paper P is sent to the point of pressure contact (nip) between a pair of fixing rollers at a fixing device (example of a fixing component) 28. The toner image is fixed on the recording paper P there, giving a fixed image.

The recording paper P to which the toner image is transferred can be, for example, a piece of ordinary printing paper for copiers, printers, etc., of electrophotographic type. Recording media such as overhead-projector (OHP) sheets may also be used.

The use of recording paper P having a smooth surface may help further improve the smoothness of the surface of the fixed image. For example, coated paper, which is paper with a coating, for example of resin, on its surface, or art paper for printing may be used.

The recording paper P with a completely fixed color image thereon is transported to an ejection section to finish the formation of a color image.

Process Cartridge/Toner Cartridge

The following describes a process cartridge according to an exemplary embodiment.

A process cartridge according to this exemplary embodiment includes a developing component that contains an electrostatic charge image developer according to an above exemplary embodiment and develops, using the electrostatic charge image developer, an electrostatic charge image created on the surface of an image carrier to form a toner image. The process cartridge can be attached to and detached from an image forming apparatus.

This is not the only possible configuration of a process cartridge according to this exemplary embodiment. Besides the developing component, the process cartridge may optionally have at least one extra component selected from an image carrier, a charging component, an electrostatic charge image creating component, a transfer component, etc.

The following describes an example of a process cartridge according to this exemplary embodiment. This is not the only possible form. The following describes some of its structural elements with reference to a drawing.

Figure 2:
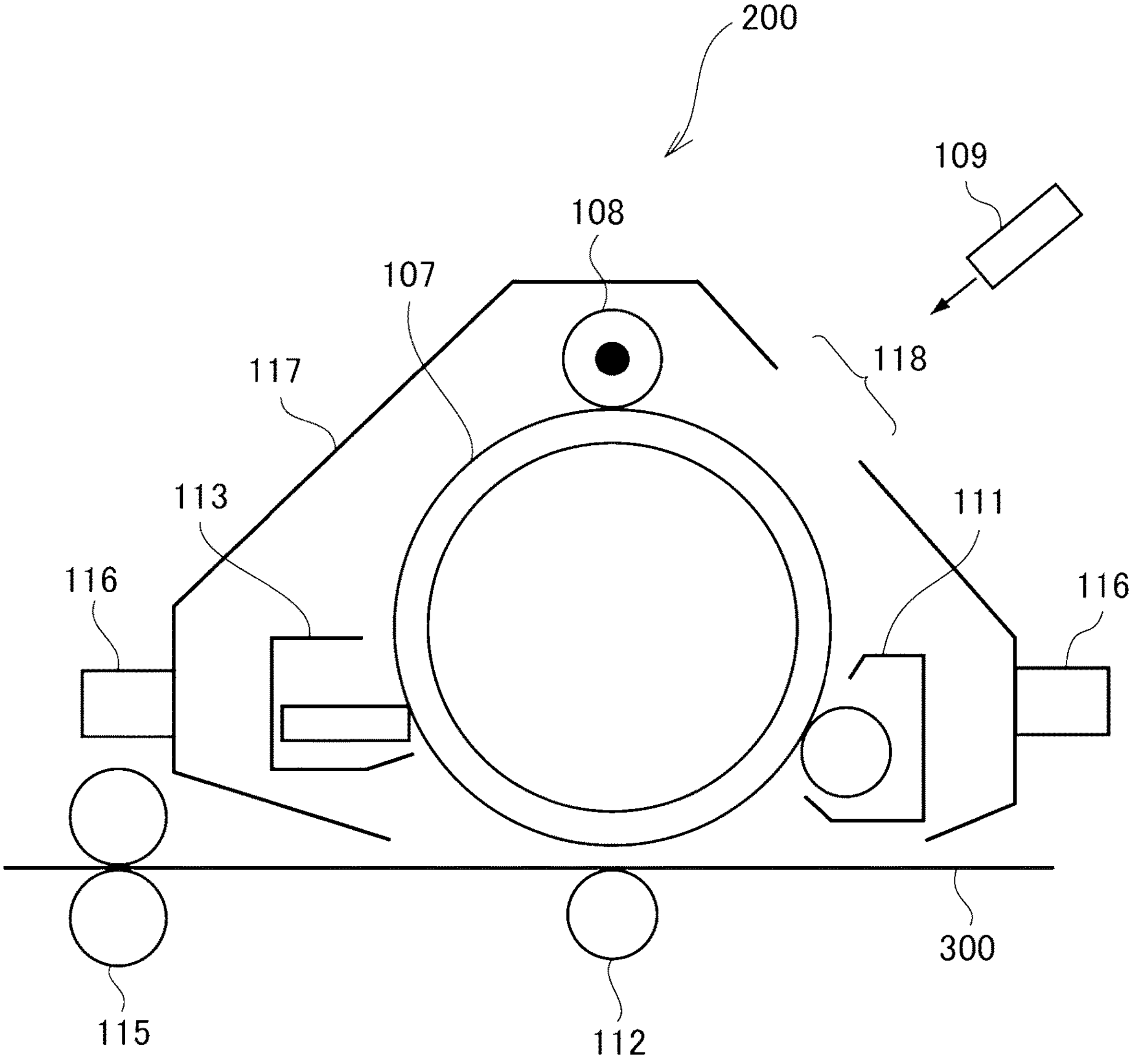
FIG. 2 is a schematic view of the structure of an example of a process cartridge according to an exemplary embodiment that is attached to and detached from an image forming apparatus.

FIG. 2 is a schematic view of the structure of a process cartridge according to this exemplary embodiment.

The process cartridge 200 illustrated in FIG. 2 is a cartridge formed by, for example, a housing 117 and components held together therein. The housing 117 has attachment rails 116 and an opening 118 for exposure to light. The components inside the housing 117 include a photoreceptor 107 (example of an image carrier) and a charging roller 108 (example of a charging component), a developing device 111 (example of a developing component), and a photoreceptor cleaning device 113 (example of a cleaning component) disposed around the photoreceptor 107.

FIG. 2 also illustrates an exposure device (example of an electrostatic charge image creating component) 109, a transfer device (example of a transfer component) 112, a fixing device (example of a fixing component) 115, and recording paper (example of a recording medium) 300.

The following describes a toner cartridge according to this exemplary embodiment.

A toner cartridge according to this exemplary embodiment contains toner according to an above exemplary embodiment and can be attached to and detached from an image forming apparatus. A toner cartridge is a cartridge that stores replenishment toner for a developing component placed inside an image forming apparatus.

The image forming apparatus illustrated in FIG. 1 has toner cartridges 8Y, 8M, 8C, and 8K that can be attached to and detached from it. The developing devices 4Y, 4M, 4C, and 4K are connected to their corresponding toner cartridges (or the toner cartridges for their respective colors) by toner feed tubing, not illustrated in the drawing. When there is little toner in a toner cartridge, this toner cartridge is replaced.

EXAMPLES

The following describes exemplary embodiments of the present disclosure in further detail by providing examples, but the exemplary embodiments of the present disclosure are not limited to these examples. In the following description, "parts" and "%" are by mass unless stated otherwise.

Synthesis of Amorphous Polyester Resin (A1)

Terephthalic acid: 68 parts
Fumaric acid: 32 parts
Ethylene glycol: 42 parts
1,5-Pentanediol: 47 parts These materials are put into a flask equipped with a stirrer, a nitrogen inlet tube, a temperature sensor, and a rectifying column. With a nitrogen stream into the flask, the temperature is increased to 220° C. over 1 hour. One part of titanium tetraethoxide is added to a total of 100 parts of the above materials. The temperature is increased to 240° C. over 0.5 hours while water is removed by distillation as it is formed. After 1 hour of dehydration condensation at 240° C., the reaction product is cooled. The resulting resin is amorphous polyester resin (A1). Its weight-average molecular weight is 97000, and its glass transition temperature is 60° C.

Synthesis of Amorphous Polyester Resin (A2)

Terephthalic acid: 63 parts
Fumaric acid: 28 parts
Ethylene glycol: 37 parts
1,5-Pentanediol: 43 parts A resin is synthesized in the same way as amorphous polyester resin (A1) except that the amounts of materials are changed as listed above. The resulting resin is amorphous polyester resin (A2). Its weight-average molecular weight is 74000, and its glass transition temperature is 57° C.

Production of Crystalline Polyester Resin (B1)

1,10-Decanedicarboxylic acid: 260 parts
1,6-Hexanediol: 167 parts
Dibutyltin oxide (catalyst): 0.3 parts These materials are put into a three-neck flask dried by heating. After the air in the flask is replaced with nitrogen gas to create an inert atmosphere, the materials are stirred under reflux for 5 hours at 180° C. by mechanical stirring. Then the resulting mixture is heated to 230° C. gently and stirred for 2 hours under reduced pressure. The thickened mixture is air-cooled to terminate the reaction. The resulting resin is crystalline polyester resin (B1). Its weight-average molecular weight is 12500, and its melting temperature is 73° C.

Production of Crystalline Polyester Resin (B2)

1,10-Decanedicarboxylic acid: 450 parts
1,6-Hexanediol: 310 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B2). Its weight-average molecular weight is 30000, and its melting temperature is 79° C.

Production of Crystalline Polyester Resin (B3)

Adipic acid: 239 parts
1,6-Hexanediol: 191 parts
Dibutyltin oxide (catalyst): 0.3 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B3). Its weight-average molecular weight is 5000, and its melting temperature is 55° C.

Production of Crystalline Polyester Resin (B4)

Fumaric acid: 310 parts
1,6-Hexanediol: 210 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B4). Its weight-average molecular weight is 45000, and its melting temperature is 115° C.

Production of Crystalline Polyester Resin (B5)

Fumaric acid: 300 parts
1,6-Hexanediol: 205 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B5). Its weight-average molecular weight is 44000, and its melting temperature is 112° C.

Production of Crystalline Polyester Resin (B6)

Fumaric acid: 290 parts
1,6-Hexanediol: 200 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B6). Its weight-average molecular weight is 43000, and its melting temperature is 110° C.

Production of Crystalline Polyester Resin (B7)

Sebacic acid: 404 parts
1,4-Butanediol: 180 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B7). Its weight-average molecular weight is 10000, and its melting temperature is 65° C.

Production of Crystalline Polyester Resin (B8)

Suberic acid: 348 parts
1,6-Hexanediol: 226 parts
Dibutyltin oxide (catalyst): 0.5 parts These materials are put into a three-neck flask dried by heating. After the air in the flask is replaced with nitrogen gas to create an inert atmosphere, the materials are stirred under reflux for 6 hours at 180° C. by mechanical stirring. Then the resulting mixture is heated to 230° C. gently and stirred for 3 hours under reduced pressure. The thickened mixture is air-cooled to terminate the reaction. The resulting resin is crystalline polyester resin (B8). Its weight-average molecular weight is 7500, and its melting temperature is 60° C.

Production of Oligomer (1)

A mixture of styrene, isopropenyltoluene, and dehydrated toluene (monomers/toluene=1/1 by volume) and a boron trifluoride phenolate complex diluted 1:10 with dehydrated toluene (1.7 times equivalent of phenol) are fed sequentially into a 2-L autoclave having stirring blades, and the monomers are polymerized at a reaction temperature of 5° C. The molar ratio between styrene and isopropenyltoluene is 20/80, the supply rate of the monomer-toluene mixture is 1.0 liter/hour, and that of the diluted catalyst is 90 milliliters/hour. The reaction mixture is sent to a second autoclave and further polymerized there at 5° C. After a total of 1 hour in the first and second autoclaves, the reaction mixture is discharged continuously. At 1.5 times the time of residence, one liter of the reaction mixture is collected to terminate the polymerization. After the end of polymerization, the residual catalyst in the collected reaction mixture is removed by adding a 1-N aqueous solution of NaOH. Then the reaction mixture is washed with plenty of water five times and distilled under reduced pressure using an evaporator to remove the solvent and unreacted monomers. The product is oligomer (1). Its softening temperature (Tm) is 120° C., and its weight-average molecular weight (Mw) is 560.

Production of Oligomer (2)

An oligomer is produced in the same way as oligomer (1) except for the following changes: Styrene is replaced with dicyclopentadiene, and the molar ratio between dicyclopentadiene and isopropenyltoluene is 40/60. The total time of residence in the first and second autoclaves is 4 hours, and the polymerization is terminated by collecting one liter of the reaction mixture at 3.5 times the time of residence. The product is oligomer (2). Its softening temperature (Tm) is 165° C., and its weight-average molecular weight (Mw) is 3120.

Production of Oligomer (3)

An oligomer is produced in the same way as oligomer (1) except that the total time of residence in the first and second autoclaves is 0.8 hours, and the polymerization is terminated by collecting one liter of the reaction mixture at 1.3 times the time of residence. The product is oligomer (3). Its softening temperature (Tm) is 120° C., and its weight-average molecular weight (Mw) is 500.

Production of Oligomer (4)

An oligomer is produced in the same way as oligomer (1) except that the total time of residence in the first and second autoclaves is 3 hours, and the polymerization is terminated by collecting one liter of the reaction mixture at 3.5 times the time of residence. The product is oligomer (4). Its softening temperature (Tm) is 120° C., and its weight-average molecular weight (Mw) is 5000.

Production of Oligomer (5)

An oligomer is produced in the same way as oligomer (2) except that the total time of residence in the first and second autoclaves is 1 hour, and the polymerization is terminated by collecting one liter of the reaction mixture at 1.5 times the time of residence. The product is oligomer (5). Its softening temperature (Tm) is 165° C., and its weight-average molecular weight (Mw) is 560.

Production of Oligomer (6)

An oligomer is produced in the same way as oligomer (2) except that the total time of residence in the first and second autoclaves is 1 hour, and the polymerization is terminated by collecting one liter of the reaction mixture at 1.4 times the time of residence. The product is oligomer (6). Its softening temperature (Tm) is 165° C., and its weight-average molecular weight (Mw) is 540.

Production of Oligomer (7)

An oligomer is produced in the same way as oligomer (2) except that the total time of residence in the first and second autoclaves is 2 hours, and the polymerization is terminated by collecting one liter of the reaction mixture at 2.5 times the time of residence. The product is oligomer (7). Its softening temperature (Tm) is 165° C., and its weight-average molecular weight (Mw) is 1300.

Production of Oligomer (8)

An oligomer is produced in the same way as oligomer (1) except that the total time of residence in the first and second autoclaves is 0.5 hours, and the polymerization is terminated by collecting one liter of the reaction mixture at 12 times the time of residence. The product is oligomer (8). Its softening temperature (Tm) is 120° C., and its weight-average molecular weight (Mw) is 400.

Production of Oligomer (9)

An oligomer is produced in the same way as oligomer (1) except that the total time of residence in the first and second autoclaves is 3.2 hours, and the polymerization is terminated by collecting one liter of the reaction mixture at 3.6 times the time of residence. The product is oligomer (9). Its softening temperature (Tm) is 120° C., and its weight-average molecular weight (Mw) is 5100.

Example 1

Amorphous polyester resin (A1): 73 parts

Crystalline polyester resin (B1): 7 parts

An oligomer: 8 parts of a C9 petroleum resin (Petcoal 120, Tosoh); molecular weight, 1500; softening temperature, 120° C.

A coloring agent (carbon black; Mitsubishi Chemical #25): 7 parts

A release agent (paraffin wax; Nippon Seiro HNP 9): 5 parts

These materials are mixed together in a Henschel mixer (FM75L, Nippon Coke & Engineering), the resulting mixture is kneaded through a twin-screw extruder (TEM-48SS, Shibaura Machine), the kneaded mixture is rolled, and the rolled mixture is cooled at a rate of 9° C./sec. The cooled mixture is shredded in a hammer mill, and the resulting grains are pulverized in a jet mill (AFG, Hosokawa Micron). The resulting particles are classified using an elbow-jet classifier (EJ-LABO, Nittetsu Mining), and the classified particles are blown with hot air at 180° C. for 1 hour. The resulting particles are toner particles 1.

Toner particles 1: 100 parts

Sol-gel silica particles (number-average diameter=120 nm): 2.0 parts

Strontium titanate particles (number-average diameter=50 nm): 0.2 parts

These materials are mixed together in a Henschel mixer. The product is toner 1.

Example 2

Toner is obtained in the same way as in Example 1 except that the amount of crystalline polyester resin (B1) is changed to be 10% by mass (of the toner particles). The resulting toner is toner 2.

Example 3

Toner is obtained in the same way as in Example 2 except that the amount of the oligomer is changed to be 15% by mass (of the toner particles). The resulting toner is toner 3.

Example 4

Toner is obtained in the same way as in Example 1 except that amorphous polyester resin (A2) and crystalline polyester resin (B2) are used. The resulting toner is toner 4.

Example 5

Toner is obtained in the same way as in Example 4 except that the oligomer is changed to a C5/C9 petroleum resin (RD104, ENEOS; molecular weight, 2500; softening temperature, 103° C.). The resulting toner is toner 5.

Example 6

Toner is obtained in the same way as in Example 4 except that the rate of cooling is changed to 15° C./sec. The resulting toner is toner 6.

Example 7

Toner is obtained in the same way as in Example 4 except that the rate of cooling is changed to 2° C./sec. The resulting toner is toner 7.

Example 8

Toner is obtained in the same way as in Example 2 except that crystalline polyester resin (B3) and oligomer (1) are used. The resulting toner is toner 8.

Example 9

Toner is obtained in the same way as in Example 2 except that crystalline polyester resin (B4) and oligomer (2) are used. The resulting toner is toner 9.

Example 10

Toner is obtained in the same way as in Example 2 except that oligomer (3) is used. The resulting toner is toner 10.

Example 11

Toner is obtained in the same way as in Example 4 except that oligomer (4) is used. The resulting toner is toner 11.

Example 12

Toner is obtained in the same way as in Example 2 except that oligomer (2) is used. The resulting toner is toner 12.

Example 13

Toner is obtained in the same way as in Example 2 except that the oligomer is changed to a C5/C9 petroleum resin (RD104, ENEOS; molecular weight, 2500; softening temperature, 103° C.). The resulting toner is toner 13.

Example 14

Toner is obtained in the same way as in Example 9 except that oligomer (5) is used. The resulting toner is toner 14.

Example 15

Toner is obtained in the same way as in Example 9 except that oligomer (6) is used. The resulting toner is toner 15.

Example 16

Toner is obtained in the same way as in Example 4 except that crystalline polyester resin (B5) is used. The resulting toner is toner 16.

Example 17

Toner is obtained in the same way as in Example 4 except that crystalline polyester resin (B6) is used. The resulting toner is toner 17.

Example 18

Toner is obtained in the same way as in Example 2 except that crystalline polyester resin (B7) and oligomer (7) are used. The resulting toner is toner 18.

Example 19

Toner is obtained in the same way as in Example 18 except that crystalline polyester resin (B8) is used. The resulting toner is toner 19.

Example 20

Toner is obtained in the same way as in Example 3 except that the amount of crystalline polyester resin (B1) is changed to 1.2% by mass (of the toner particles). The resulting toner is toner 20.

Example 21

Toner is obtained in the same way as in Example 3 except that the amount of crystalline polyester resin (B1) is changed to 1.5% by mass (of the toner particles). The resulting toner is toner 21.

Example 22

Toner is obtained in the same way as in Example 2 except that the amount of crystalline polyester resin (B1) is changed to 7.5% by mass (of the toner particles), and that of the C9 petroleum resin is changed to 0.5% by mass (of the toner particles). The resulting toner is toner 22.

Example 23

Toner is obtained in the same way as in Example 22 except that the amount of crystalline polyester resin (B1) is changed to 8% by mass (of the toner particles). The resulting toner is toner 23.

Example 24

Toner is obtained in the same way as in Example 3 except that the amount of crystalline polyester resin (B1) is changed to 0.8% by mass (of the toner particles), and that of the C9 petroleum resin is changed to 4% by mass (of the toner particles). The resulting toner is toner 24.

Example 25

Toner is obtained in the same way as in Example 24 except that the amount of crystalline polyester resin (B1) is changed to 1% by mass (of the toner particles). The resulting toner is toner 25.

Example 26

Toner is obtained in the same way as in Example 24 except that the amount of crystalline polyester resin (B1) is changed to 15% by mass (of the toner particles). The resulting toner is toner 26.

Example 27

Toner is obtained in the same way as in Example 24 except that the amount of crystalline polyester resin (B1) is changed to 16% by mass (of the toner particles). The resulting toner is toner 27.

Example 28

Toner is obtained in the same way as in Example 2 except that the rate of cooling is changed to 13° C./sec. The resulting toner is toner 28.

Example 29

Toner is obtained in the same way as in Example 2 except that the rate of cooling is changed to 12° C./sec. The resulting toner is toner 29.

Example 30

Toner is obtained in the same way as in Example 2 except that the rate of cooling is changed to 5° C./sec. The resulting toner is toner 30.

Example 31

Toner is obtained in the same way as in Example 2 except that the rate of cooling is changed to 4° C./sec. The resulting toner is toner 31.

Example 32

Toner is obtained in the same way as in Example 2 except that the rate of cooling is changed to 12.5° C./sec, and the duration of hot-air blow is changed to 0.4 hours. The resulting toner is toner 32.

Example 33

Toner is obtained in the same way as in Example 2 except that the rate of cooling is changed to 11.5° C./sec, and the duration of hot-air blow is changed to 0.5 hours. The resulting toner is toner 33.

Example 34

Toner is obtained in the same way as in Example 2 except that the rate of cooling is changed to 6° C./sec, and the duration of hot-air blow is changed to 2 hours. The resulting toner is toner 34.

Example 35

Toner is obtained in the same way as in Example 2 except that the rate of cooling is changed to 3° C./sec, and the duration of hot-air blow is changed to 3 hours. The resulting toner is toner 35.

Comparative Example 1

Toner is obtained in the same way as in Example 2 except that the rate of cooling is changed to 14° C./sec. The resulting toner is toner C1.

Comparative Example 2

Toner is obtained in the same way as in Example 2 except that the rate of cooling is changed to 1° C./sec. The resulting toner is toner C2.

Comparative Example 3

Toner is obtained in the same way as in Example 2 except that oligomer (8) is used. The resulting toner is toner C3.

Comparative Example 4

Toner is obtained in the same way as in Example 4 except that oligomer (9) is used. The resulting toner is toner C4.

Comparative Example 5

Toner is obtained in the same way as in Example 2 except that no oligomer is used. The resulting toner is toner C5.

Testing

Characterization

The following characteristics of the toners of Examples and Comparative Examples are measured as described above.

- Whether a molecular weight distribution curve of the toner measured by gel permeation chromatography has its highest peak in a range of molecular weights from 5000 to 50000 and has a peak or shoulder in a range of molecular weights from 500 to 5000
- Average length of major axis of crystalline-resin domains
- Relative area Ps of the crystalline resin in the region of the toner particles from the surface to a depth of 0.30 μm
- Relative area Pb of the crystalline resin across the toner particles Fixation Developers for the image forming apparatus below are prepared with the toners of Examples and Comparative Examples.

With each of the developers, a halftone image of low area coverage (5%) is printed on 100 sheets of OPP50C PAT1E 8LK recording medium (Lintec) using a developing device of Fuji Xerox's ApeosPort Print C4570 image forming apparatus.

A piece of Scotch Transparent Tape (3M) is attached to the image on the 100th sheet with a load of 1 kg, the tape is removed all at once, and the percentage of remaining image (image density after removal/image density before removal) is measured using X-Rite 962 spectrocolorimeter (Videojet X-Rite). Based on the measured percentage, fixation is graded according to the criteria below. A "D" or better grade is acceptable.

- A: After removal of the tape, 99% or more of the image remains
- B: After removal of the tape, 98% or more of the image remains
- C: After removal of the tape, 95% or more of the image remains
- D: After removal of the tape, 94% or more of the image remains
- E: After removal of the tape, less than 92% of the image remains The results are presented in Tables 1-1 and 1-2.

- Molecular weight Ma: Weight-average molecular weight Ma of the amorphous resin
- Major axis length: Average length of major axis of crystalline-resin domains
- Molecular weight Mc: Weight-average molecular weight Mc of the crystalline resin
- Melting temperature Tc: Melting temperature of the crystalline resin
- Content Wc: Crystalline resin content Wc of the toner particles
- Relative area Ps: Relative area Ps of the crystalline resin in the region of the toner particles from the surface to a depth of 0.30 μm
- Relative area Pb: Relative area Pb of the crystalline resin across the toner particles
- Molecular weight Mo: Weight-average molecular weight Mo of the oligomer
- Softening temperature To: Softening temperature To of the oligomer
- Content Wo: Oligomer content Wo of the toner particles In the tables, "None" in the "Molecular weights 500 to 5000" column under Molecular weight curve means the molecular weight curve has no peak or shoulder in a range of molecular weights from 500 to 5000.

TABLE 1-1

| | Toner | | Toner particles | | | | | | | |
|---|---|---|---|---|---|---|---|---|---|---|
| | Molecular weight curve | | Amorphous | Crystalline resin | | | | | | |
| | Molecular weights 5000 to 50000 | Molecular weights 500 to 5000 | resin Molecular weight Ma | Major axis length μm | Molecular weight Mc | Melting temperature Tc ° C. | Content Wc % by mass | Relative area Ps % | Relative area Pb % | Ps/ Pb |
| Example 1 | Highest peak | Peak | 97000 | 200 | 12500 | 73 | 7 | 1.5 | 5 | 0.30 |
| Example 2 | Highest peak | Peak | 97000 | 250 | 12500 | 73 | 10 | 2 | 7 | 0.29 |
| Example 3 | Highest peak | Peak | 97000 | 250 | 12500 | 73 | 10 | 2 | 7 | 0.29 |
| Example 4 | Highest peak | Peak | 74000 | 350 | 30000 | 79 | 10 | 2.5 | 8 | 0.31 |
| Example 5 | Highest peak | Peak | 74000 | 350 | 30000 | 79 | 10 | 2.5 | 8 | 0.31 |
| Example 6 | Highest peak | Peak | 74000 | 100 | 30000 | 79 | 10 | 1 | 6.5 | 0.15 |
| Example 1 | Highest peak | Peak | 74000 | 1000 | 30000 | 79 | 10 | 3.5 | 10 | 0.35 |
| Example 8 | Highest peak | Peak | 97000 | 200 | 5000 | 55 | 10 | 3 | 8 | 0.38 |
| Example 9 | Highest peak | Peak | 74000 | 350 | 45000 | 115 | 10 | 2 | 8 | 0.25 |
| Example 10 | Highest peak | Peak | 97000 | 250 | 12500 | 73 | 10 | 2 | 8 | 0.25 |
| Example 11 | Highest peak | Peak | 74000 | 350 | 30000 | 79 | 10 | 2 | 8 | 0.25 |
| Example 12 | Highest peak | Peak | 97000 | 250 | 12500 | 73 | 10 | 3 | 8 | 0.38 |
| Example 13 | Highest peak | Peak | 97000 | 250 | 12500 | 73 | 10 | 3 | 8 | 0.38 |
| Example 14 | Highest peak | Peak | 74000 | 350 | 45000 | 115 | 10 | 2 | 8 | 0.25 |
| Example 15 | Highest peak | Peak | 74000 | 350 | 45000 | 115 | 10 | 2 | 8 | 0.25 |
| Example 16 | Highest peak | Peak | 74000 | 350 | 44000 | 112 | 10 | 2 | 8 | 0.25 |
| Example 17 | Highest peak | Peak | 74000 | 350 | 43000 | 110 | 10 | 2 | 8 | 0.25 |
| Example 18 | Highest peak | Peak | 97000 | 170 | 10000 | 65 | 10 | 2 | 8 | 0.25 |
| Example 19 | Highest peak | Peak | 97000 | 170 | 7500 | 60 | 10 | 2 | 8 | 0.25 |
| Example 20 | Highest peak | Peak | 97000 | 250 | 12500 | 73 | 1.2 | 0.5 | 2 | 0.25 |

| | Toner particles | | | | | | | |
|---|---|---|---|---|---|---|---|---|
| | Oligomer | | | | | | | |
| | Type | Molecular weight Mo | Softening temperature To ° C. | Content Wo % by mass | Mc/ Mo | To − Tc | Wc/ Wo | Testing Fixation |
| Example 1 | C9 petroleum resin | 1500 | 120 | 8 | 8 | 47 | 0.9 | A |
| Example 2 | C9 petroleum resin | 1500 | 120 | 8 | 8 | 47 | 1.3 | A |
| Example 3 | C9 petroleum resin | 1500 | 120 | 15 | 8 | 47 | 0.7 | A |
| Example 4 | C9 petroleum resin | 1500 | 120 | 8 | 20 | 41 | 1.3 | A |
| Example 5 | C5/C9 petroleum resin | 2500 | 103 | 8 | 12 | 24 | 1.3 | A |
| Example 6 | C9 petroleum resin | 1500 | 120 | 8 | 20 | 41 | 1.3 | B |
| Example 1 | C9 petroleum resin | 1500 | 120 | 8 | 20 | 41 | 1.3 | B |
| Example 8 | Oligomer (1) | 560 | 120 | 8 | 9 | 65 | 1.3 | B |
| Example 9 | Oligomer (2) | 3120 | 165 | 8 | 14 | 50 | 1.3 | B |
| Example 10 | Oligomer (3) | 500 | 120 | 8 | 25 | 47 | 1.3 | B |
| Example 11 | Oligomer (4) | 5000 | 120 | 8 | 6 | 41 | 1.3 | B |
| Example 12 | Oligomer (2) | 3120 | 165 | 8 | 4 | 92 | 1.3 | D |
| Example 13 | C5/C9 petroleum resin | 2500 | 103 | 8 | 5 | 30 | 1.3 | C |
| Example 14 | Oligomer (5) | 560 | 165 | 8 | 80 | 50 | 1.3 | C |
| Example 15 | Oligomer (6) | 540 | 165 | 8 | 82 | 50 | 1.3 | D |
| Example 16 | C9 petroleum resin | 1500 | 120 | 8 | 29 | 8 | 1.3 | D |
| Example 17 | C9 petroleum resin | 1500 | 120 | 8 | 29 | 10 | 1.3 | C |
| Example 18 | Oligomer (7) | 1300 | 165 | 8 | 8 | 100 | 1.3 | C |
| Example 19 | Oligomer (7) | 1300 | 165 | 8 | 6 | 105 | 1.3 | D |
| Example 20 | C9 petroleum resin | 1500 | 120 | 15 | 8 | 47 | 0.08 | D |

TABLE 1-2

| | Toner | | Toner particles | | | | | | | |
|---|---|---|---|---|---|---|---|---|---|---|
| | Molecular weight curve | | Amorphous | Crystalline resin | | | | | | |
| | Molecular weights 5000 to 50000 | Molecular weights 500 to 5000 | resin Molecular weight Ma | Major axis length μm | Molecular weight Mc | Melting temperature Tc ° C. | Content Wc % by mass | Relative area Ps % | Relative area Pb % | Ps/ Pb |
| Example 21 | Highest peak | Peak | 97000 | 250 | 12500 | 73 | 1.5 | 0.6 | 2.4 | 0.25 |
| Example 22 | Highest peak | Peak | 97000 | 250 | 12500 | 73 | 7.5 | 1.2 | 6 | 0.20 |
| Example 23 | Highest peak | Peak | 97000 | 250 | 12500 | 73 | 8 | 1.5 | 6.5 | 0.23 |
| Example 24 | Highest peak | Peak | 97000 | 250 | 12500 | 73 | 0.8 | 0.3 | 1.8 | 0.17 |
| Example 25 | Highest peak | Peak | 97000 | 250 | 12500 | 73 | 1 | 0.4 | 1.9 | 0.21 |
| Example 26 | Highest peak | Peak | 97000 | 250 | 12500 | 73 | 15 | 3 | 12 | 0.25 |

TABLE 1-2-continued

| | | | | | | | | | | |
|---|---|---|---|---|---|---|---|---|---|---|
| Example 27 | Highest peak | Peak | 97000 | 250 | 12500 | 73 | 16 | 3.2 | 13 | 0.25 |
| Example 28 | Highest peak | Peak | 97000 | 120 | 12500 | 73 | 10 | 0.8 | 6.5 | 0.12 |
| Example 29 | Highest peak | Peak | 97000 | 150 | 12500 | 73 | 10 | 1 | 6.5 | 0.15 |
| Example 30 | Highest peak | Peak | 97000 | 500 | 12500 | 73 | 10 | 2.5 | 9 | 0.28 |
| Example 31 | Highest peak | Peak | 97000 | 550 | 12500 | 73 | 10 | 2.7 | 9 | 0.30 |
| Example 32 | Highest peak | Peak | 97000 | 140 | 12500 | 73 | 10 | 0.5 | 6 | 0.08 |
| Example 33 | Highest peak | Peak | 97000 | 160 | 12500 | 73 | 10 | 0.6 | 6 | 0.10 |
| Example 34 | Highest peak | Peak | 97000 | 450 | 12500 | 73 | 10 | 4.5 | 9 | 0.50 |
| Example 35 | Highest peak | Peak | 97000 | 600 | 12500 | 73 | 10 | 7 | 10 | 0.70 |
| Comparative Example 1 | Highest peak | Peak | 97000 | 90 | 12500 | 73 | 10 | 0.9 | 6.5 | 0.14 |
| Comparative Example 2 | Highest peak | Peak | 97000 | 1050 | 12500 | 73 | 10 | 3.8 | 10 | 0.38 |
| Comparative Example 3 | Highest peak | None | 97000 | 250 | 12500 | 73 | 10 | 2 | 8 | 0.25 |
| Comparative Example 4 | Highest peak | None | 74000 | 350 | 30000 | 79 | 10 | 2 | 8 | 0.25 |
| Comparative Example 5 | Highest peak | None | 97000 | 250 | 12500 | 73 | 10 | 2 | 8 | 0.25 |

| | Toner particles | | | | | | | |
|---|---|---|---|---|---|---|---|---|
| | Oligomer | | | | | | | |
| | Type | Molecular weight Mo | Softening temperature To ° C. | Content Wo % by mass | Mc/Mo | To − Tc | Wc/Wo | Testing Fixation |
| Example 21 | C9 petroleum resin | 1500 | 120 | 15 | 8 | 47 | 0.1 | C |
| Example 22 | C9 petroleum resin | 1500 | 120 | 0.5 | 8 | 47 | 15.0 | C |
| Example 23 | C9 petroleum resin | 1500 | 120 | 0.5 | 8 | 47 | 16.0 | D |
| Example 24 | C9 petroleum resin | 1500 | 120 | 4 | 8 | 47 | 0.2 | D |
| Example 25 | C9 petroleum resin | 1500 | 120 | 4 | 8 | 47 | 0.3 | C |
| Example 26 | C9 petroleum resin | 1500 | 120 | 4 | 8 | 47 | 3.8 | C |
| Example 27 | C9 petroleum resin | 1500 | 120 | 4 | 8 | 47 | 4.0 | D |
| Example 28 | C9 petroleum resin | 1500 | 120 | 8 | 8 | 47 | 1.3 | D |
| Example 29 | C9 petroleum resin | 1500 | 120 | 8 | 8 | 47 | 1.3 | C |
| Example 30 | C9 petroleum resin | 1500 | 120 | 8 | 8 | 47 | 1.3 | C |
| Example 31 | C9 petroleum resin | 1500 | 120 | 8 | 8 | 47 | 1.3 | D |
| Example 32 | C9 petroleum resin | 1500 | 120 | 8 | 8 | 47 | 1.3 | D |
| Example 33 | C9 petroleum resin | 1500 | 120 | 8 | 8 | 47 | 1.3 | C |
| Example 34 | C9 petroleum resin | 1500 | 120 | 8 | 8 | 47 | 1.3 | C |
| Example 35 | C9 petroleum resin | 1500 | 120 | 8 | 8 | 47 | 1.3 | D |
| Comparative Example 1 | C9 petroleum resin | 1500 | 120 | 8 | 8 | 47 | 1.3 | E |
| Comparative Example 2 | C9 petroleum resin | 1500 | 120 | 8 | 8 | 47 | 1.3 | E |
| Comparative Example 3 | Oligomer (8) | 400 | 120 | 8 | 31 | 47 | 1.3 | E |
| Comparative Example 4 | Oligomer (9) | 5100 | 120 | 8 | 6 | 41 | 1.3 | E |
| Comparative Example 5 | — | — | — | — | — | — | — | E |

As can be seen from these data, the toners of Examples are superior to those of Comparative Examples in the fixation of images formed therewith.

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. A toner for developing an electrostatic charge image, the toner comprising:

toner particles that contain binder resins including an amorphous resin having a weight-average molecular weight of 6000 or more and 200000 or less and a crystalline resin having a weight-average molecular weight of 5000 or more and 45000 or less and also contain an oligomer having a weight-average molecular weight of 500 or more and 5000 or less, wherein:

in a cross-sectional observation of the toner particles, domains of the crystalline resin have an average length of major axis of 100 nm or more and 1000 nm or less, wherein $0.9 \leq Wc/Wo \leq 15$, where Wc and Wo represent an entire content of all crystalline resin and an entire content of all oligomer, respectively, of the toner particles.

2. The toner according to claim 1 for developing an electrostatic charge image, wherein $5 \leq Mc/Mo \leq 80$, where Mc and Mo are weight-average molecular weights of all of the crystalline resin and all of the oligomer, respectively, of the toner particles.

3. The toner according to claim 1 for developing an electrostatic charge image, wherein $10 \leq To-Tc \leq 100$, where Tc and To are a melting temperature of the crystalline resin and a softening temperature of the oligomer, respectively, both measured using a flow tester.

4. The toner according to claim 1 for developing an electrostatic charge image, wherein the crystalline resin content Wc of the toner particles is 1% by mass or more and 15% by mass or less.

5. The toner according to claim 1 for developing an electrostatic charge image, wherein the average length of major axis of domains of the crystalline resin is 150 nm or more and 500 nm or less.

6. The toner according to claim 1 for developing an electrostatic charge image, wherein in a cross-sectional observation of the toner particles, $0.1 \leq Ps/Pb \leq 0.5$, where Ps and Pb are relative areas of the crystalline resin in a region of the toner particles from an outermost surface to a depth of 0.30 μm and across the entire cross-section of the toner particles, respectively.

7. The toner according to claim 1 for developing an electrostatic charge image, wherein the oligomer comprises a C9 petroleum resin.

8. The toner according to claim 1 for developing an electrostatic charge image, wherein the oligomer has a weight average molecular weight of 500 or more and 2500 or less.

9. The toner according to claim 1 for developing an electrostatic charge image, wherein $0.9 \leq Wc/Wo \leq 5$.

* * * * *